US010798363B2

(12) United States Patent
Shen et al.

(10) Patent No.: US 10,798,363 B2
(45) Date of Patent: Oct. 6, 2020

(54) VIDEO FILE PROCESSING METHOD AND APPARATUS

(71) Applicant: Tencent Technology (Shenzhen) Company Limited, Shenzhen (CN)

(72) Inventors: Xiaobin Shen, Shenzhen (CN); Gucai Luo, Shenzhen (CN); Yu Wang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/293,391

(22) Filed: Mar. 5, 2019

(65) Prior Publication Data

US 2019/0199998 A1 Jun. 27, 2019

Related U.S. Application Data

(63) Continuation of application No. PCT/CN2017/100970, filed on Sep. 8, 2017.

(30) Foreign Application Priority Data

Oct. 26, 2016 (CN) .......................... 2016 1 0950464

(51) Int. Cl.
*H04N 7/18* (2006.01)
*H04N 13/189* (2018.01)
(Continued)

(52) U.S. Cl.
CPC ........... *H04N 13/189* (2018.05); *H04N 13/00* (2013.01); *H04N 13/139* (2018.05);
(Continued)

(58) Field of Classification Search
CPC .... H04N 13/189; H04N 13/356; H04N 13/00; H04N 13/344; H04N 13/139; H04N 13/161
(Continued)

(56) References Cited

U.S. PATENT DOCUMENTS

2009/0196567 A1* 8/2009 Sugimoto .............. H04N 7/014
386/231
2010/0073471 A1* 3/2010 Mochiduki ...... H04N 21/44218
348/77
(Continued)

FOREIGN PATENT DOCUMENTS

CN 102724466 A 10/2012
CN 103414818 11/2013
(Continued)

OTHER PUBLICATIONS

Office Action dated Aug. 7, 2019 in Chinese Patent Application No. 201610950464.8 with partial English translation.
(Continued)

*Primary Examiner* — Shan E Elahi
(74) *Attorney, Agent, or Firm* — Oblon, McClelland, Maier & Neustadt, L.L.P.

(57) ABSTRACT

A video file processing method and apparatus, configured to record a video displayed in a VR device. A device type of a first virtual reality (VR) device is detected by processing circuitry of an apparatus. The first VR device is configured to display a target video to be recorded. An application on the first VR device is detected by the processing circuitry based on the device type of the first VR device. Video data of the target video is obtained by the processing circuitry from the application on the first VR device. The video data is coded by the processing circuitry to generate a recorded video file of the target video. A video playback terminal device compatible with the first VR device is identified by the processing circuitry. The recorded video file of the target video is played back through the video playback terminal device.

20 Claims, 11 Drawing Sheets

(51) Int. Cl.
  *H04N 13/344* (2018.01)
  *H04N 13/139* (2018.01)
  *H04N 13/161* (2018.01)
  *H04N 13/356* (2018.01)
  *H04N 13/00* (2018.01)
(52) U.S. Cl.
  CPC ......... *H04N 13/161* (2018.05); *H04N 13/344* (2018.05); *H04N 13/356* (2018.05)
(58) Field of Classification Search
  USPC ........................................................ 348/144
  See application file for complete search history.

(56) References Cited

U.S. PATENT DOCUMENTS

| | | | | |
|---|---|---|---|---|
| 2011/0081132 | A1* | 4/2011 | Iwata | H04N 21/4402 386/353 |
| 2013/0070052 | A1* | 3/2013 | Yamashita | H04N 13/194 348/43 |
| 2013/0290557 | A1* | 10/2013 | Baratz | H04N 21/8456 709/231 |
| 2016/0086386 | A1 | 3/2016 | Son et al. | |
| 2016/0195923 | A1* | 7/2016 | Nauseef | G06F 3/011 348/121 |
| 2017/0337711 | A1* | 11/2017 | Ratner | H04N 19/176 |

FOREIGN PATENT DOCUMENTS

| | | |
|---|---|---|
| CN | 104580986 | 4/2015 |
| CN | 104602100 | 5/2015 |
| CN | 105117021 | 12/2015 |
| CN | 105847672 | 8/2016 |
| CN | 105915818 | 8/2016 |
| CN | 105933624 | 9/2016 |
| CN | 105939481 | 9/2016 |
| CN | 105979250 | 9/2016 |

OTHER PUBLICATIONS

Office Action dated Apr. 29, 2019 in Chinese Patent Application No. 201610950464.8 (with Concise English Translation), p. 1-13.
English Translation of Written Opinion of the International Searching Authority dated Nov. 30, 2017 in PCT/CN2017100970 filed Sep. 8, 2017. p. 1-3.
Written Opinion dated Nov. 24, 2017, in International Application No. PCT/CN2017/100970.
International Search Report dated Nov. 30, 2017 in International Application No. PCT/CN2017/100970 with English translation.

* cited by examiner

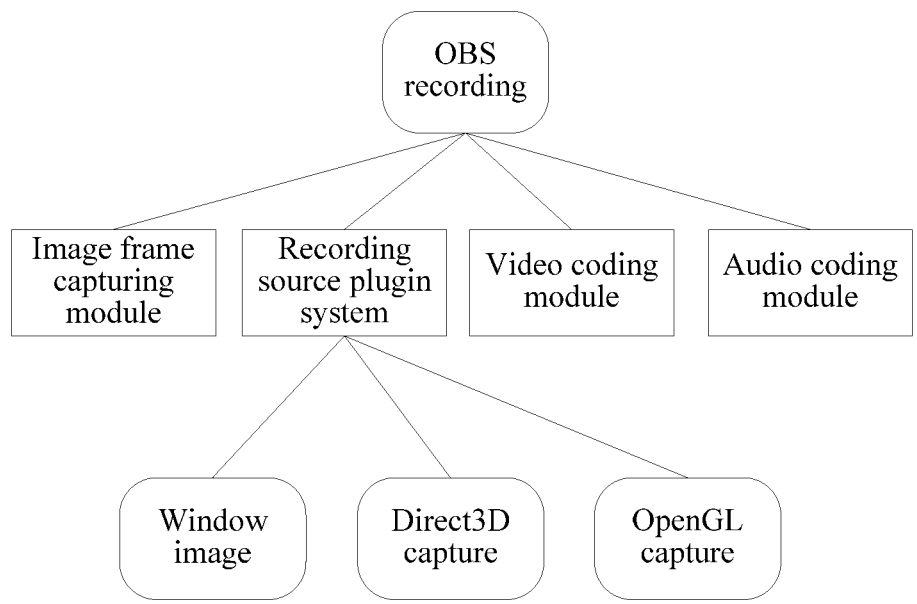
FIG. 1(Related technology)
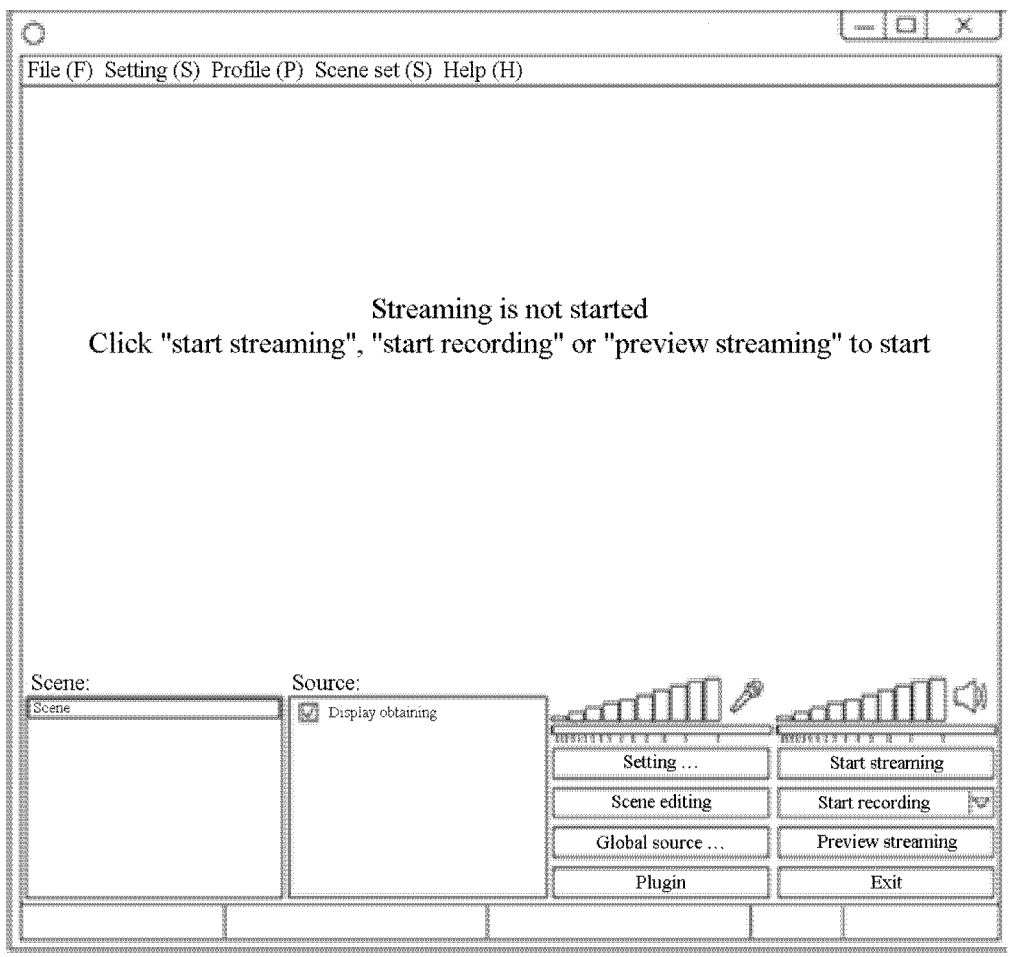
FIG. 2(Related technology)

VIDEO FILE PROCESSING METHOD AND APPARATUS

RELATED APPLICATION

This application is a continuation of International Application No. PCT/CN2017/100970, filed on Sep. 8, 2017, which claims priority to Chinese Patent Application No. 201610950464.8, entitled "VIDEO FILE PROCESSING METHOD AND APPARATUS" filed on Oct. 26, 2016. The entire disclosures of the prior applications are hereby incorporated by reference in their entirety.

FIELD OF THE TECHNOLOGY

This application relates to the field of computers.

BACKGROUND OF THE DISCLOSURE

Currently, virtual reality (VR) technology comes into vogue. The VR technology is an emulation technology by using which a virtual world can be created and experienced. According to this technology, a simulation environment is generated by using a computer, and a user is immersed into the environment due to integrated multi-source information, interactive three-dimensional (3D) dynamic visions, entity behaviors and the like in the environment. Being well interactive and multisensory, VR is widely applied to the field of entertainment such as panoramic videos and VR games. Compared with two-dimensional (2D) multimedia content, the amount of VR content is less and most of the VR content is professional-generated content (PGC). This cannot satisfy users' personalized requirements. For example, when a user experiences a VR video, VR content experienced by the user cannot be completely recorded by using a related recording technology.

For the foregoing problem that a video displayed in a VR device cannot be recorded by using a related technology, no effective solution is proposed yet.

SUMMARY

Embodiments of this application provide a video file processing method and apparatus, so as to at least resolve the technology problem that a video displayed in a VR device cannot be recorded by using the related technology.

According to one aspect of the embodiments of this application, a method and an apparatus for a video file processing are disclosed. The method and apparatus are configured to record a video displayed in a VR device. In the disclosed method, a device type of a first virtual reality (VR) device is detected by processing circuitry of the apparatus. The first VR device is configured to display a target video to be recorded. An application on the first VR device is detected by the processing circuitry based on the device type of the first VR device. Video data of the target video is obtained by the processing circuitry from the application on the first VR device. The video data is coded by the processing circuitry to generate a recorded video file of the target video. A video playback terminal device compatible with the first VR device is identified by the processing circuitry. The recorded video file of the target video is played back through the video playback terminal device.

In an embodiment, video images of the target video are captured. The video data of the target video are obtained based on the captured video images. Audio data of the target video is also obtained. The image data and the audio data are coded to generate the recorded video file.

In an embodiment, left-eye video images of the target video and right-eye video images of the target video are captured. Left-eye video data of the target video is obtained based on the left-eye video images. Right-eye video data of the target video is obtained based on the right-eye video images. The left-eye video data and the right-eye video data are stitched to obtain the video data of the target video. The video data is coded to generate the recorded video file.

In an embodiment, when the identified video playback terminal device is a two-dimensional (2D) video playback terminal device that is compatible with the first VR device based on the device type of the first VR device, the recorded video file is played back in a two-dimensional (2D) form through the 2D video playback device. When the identified video playback terminal device is a fixed VR device that is compatible with the first VR device based on the device type of the first VR device, the recorded video file is played back in a three-dimensional (3D) form through the fixed VR device. When the identified video playback terminal device is a mobile VR device that is compatible with the first VR device based on the device type of the first VR device, the processed data of the recorded video file that is provided to a preset website is played back in a three-dimensional (3D) form through the mobile VR device.

In an embodiment, the fixed VR device includes a head mounted display (HMD), the HMD plays the recorded video file in the 3D form by using a plugin.

In an embodiment, a preset process is started to detect a process of the application and window information of the application on the first VR device when the device type of the first VR device is a first device type. Further, a software development kit (SDK) of the first VR device is invoked to obtain a process identity (ID), and the process of the application and the window information of the application on the first VR device are obtained based on the process ID when the device type of the first VR device is a second device type. Next, the process of the application and the window information of the application are saved, and the application is loaded based on the process and the window information of the application.

In an embodiment, a first preset interface is displayed. Whether a start instruction is received via the first preset interface is determined. The start instruction instructs the apparatus to start recording the target video. Next, the device type of the first VR device is detected in response to the start instruction when the start instruction is determined to be received via the first preset interface. The start instruction is generated via at least one of a preset button of the first preset interface, a keyboard shortcut key of the first preset interface, or a voice command associated with the start instruction.

In an embodiment, a second preset interface is displayed. Whether an end instruction is received via the second preset interface is determined. The end instruction instructs the apparatus to stop recording the target video. Recording of the target video is stopped in response to the end instruction when the end instruction is determined to be received via the second preset interface. The end instruction is generated via at least one of a preset button of the second preset interface, a keyboard shortcut of the second preset interface, or a voice command associated with the end instruction.

In another embodiment, a third preset interface is displayed. Whether a save instruction is received via the third preset interface is determined. The save instruction instructs the apparatus to save the recorded video file. The recorded video file is saved in response to the save instruction based on the determination that the save instruction is received via third preset interface. The save instruction is generated via at least one of a preset button of the third preset interface, a keyboard shortcut key of the third preset interface, or a voice command corresponding to the save instruction.

In yet another embodiment, the recorded video file is saved in the SDK of the first VR device. The recorded video file can also be saved in an SDK of a game client. In another example, the recorded video file can be saved in an SDK of a game engine.

According to another aspect, a non-transitory computer readable storage medium is disclosed. The non-transitory computer readable storage medium stores instructions which when executed by at least one processor cause the at least one processor to perform the method for video file processing that is mentioned above.

According to the embodiments of this application, a type (or device type) of a first VR device is detected, the first VR device being used for displaying a to-be-recorded target video; an application on the first VR device is detected based on the type of the first VR device; media data (or video data) of the target video is obtained from the application on the first VR device; and the media data is coded to obtain (or generate) a recorded video file of the target video, video content of the recorded video file being the same as video content of the target video. In this way, the technical effect of recording a video displayed in a VR device is achieved, and the technology problem that a video displayed in a VR device cannot be recorded by using the related technology is resolved.

BRIEF DESCRIPTION OF THE DRAWINGS

Accompanying drawings described herein are used to provide further understanding about the embodiments of this application and form a part of this application. Exemplary embodiments of this application and descriptions thereof are used to explain the embodiments of this application, and do not constitute an inappropriate limit on the embodiments of this application. In the figures:

FIG. 1 is a schematic diagram of a frame of an OBS recording system according to the related technology;

FIG. 2 is a schematic diagram of an OBS recording operating interface according to the related technology;

DESCRIPTION OF EMBODIMENTS

To make a person in the art understand the solutions in the embodiments of this application better, the following describes the technical solutions in the embodiments of this application with reference to the accompanying drawings in the embodiments of this application.

It should be noted that, in the specification, claims, and accompanying drawings in the embodiments of this application, the terms "first", "second", and the like are intended to distinguish between similar objects instead of describe a specific order or sequence. It should be understood that the data termed in such a way are interchangeable in proper circumstances so that the embodiments of this application described herein can be implemented in orders other than the order illustrated or described herein. Moreover, the terms "include", "contain" and any other variants mean to cover the non-exclusive inclusion. For example, a process, method, system, product, or device that includes a list of steps or units is not necessarily limited to those steps or units expressly listed, but may include other steps or units not expressly listed or inherent to such a process, method, product, or device.

Related video recording may be implemented by using Open Broadcaster Software (OBS). FIG. 1 is a schematic diagram of a frame of an OBS recording system according to the related technology. As shown in FIG. 1, the OBS recording system includes an image frame capturing module, a recording source plugin system, a video coding module, and an audio coding module. The recording source plugin system can implement Window image recording, 3D specification interface (Direct3D) capture, and Open Graphics Library (OpenGL) capture. The OBS recording system can record desktop application windows on a Windows platform, Windows game images, and the like, but cannot record images in a newly emerged VR head mounted display (HMD) on a personal computer (PC) platform. On the other hand, most of video recording software such as OBS has disadvantages such as having complex interfaces and operations. FIG. 2 is a schematic diagram of an OBS recording operating interface according to the related technology. As shown in FIG. 2, a recording process starts by clicking "start streaming", "start recording" or "preview streaming". Such an interface is not user-friendly and product experience is relatively poor, and users find the product hard to use. Consequently, use of the product is affected.

In view of the foregoing problem, the embodiments of this application provide a video file processing method and apparatus, so as to at least resolve the technology problem that a video displayed in a VR device cannot be recorded by using the related technology. The following describes the embodiments of this application in detail.

According to an embodiment of this application, an embodiment of a video file processing method is provided.

Figure 3:
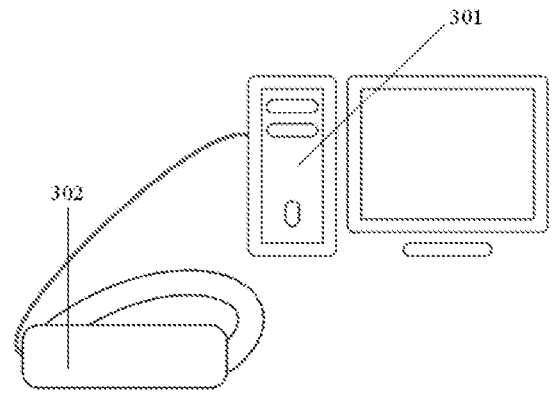
FIG. 3 is a schematic diagram of a hardware environment of a video file processing method according to an embodiment of this application.

In this embodiment, as shown in FIG. 3, the video file processing method may be applied to a terminal 301. The terminal may be a smartphone, a tablet computer, an e-book reader, a moving picture experts group audio layer 3 (MP3) player, a moving picture experts group audio layer 4 (MP4) player, a portable laptop computer, a desktop computer, or the like. The terminal may be connected to a first VR device 302.

Figure 4:
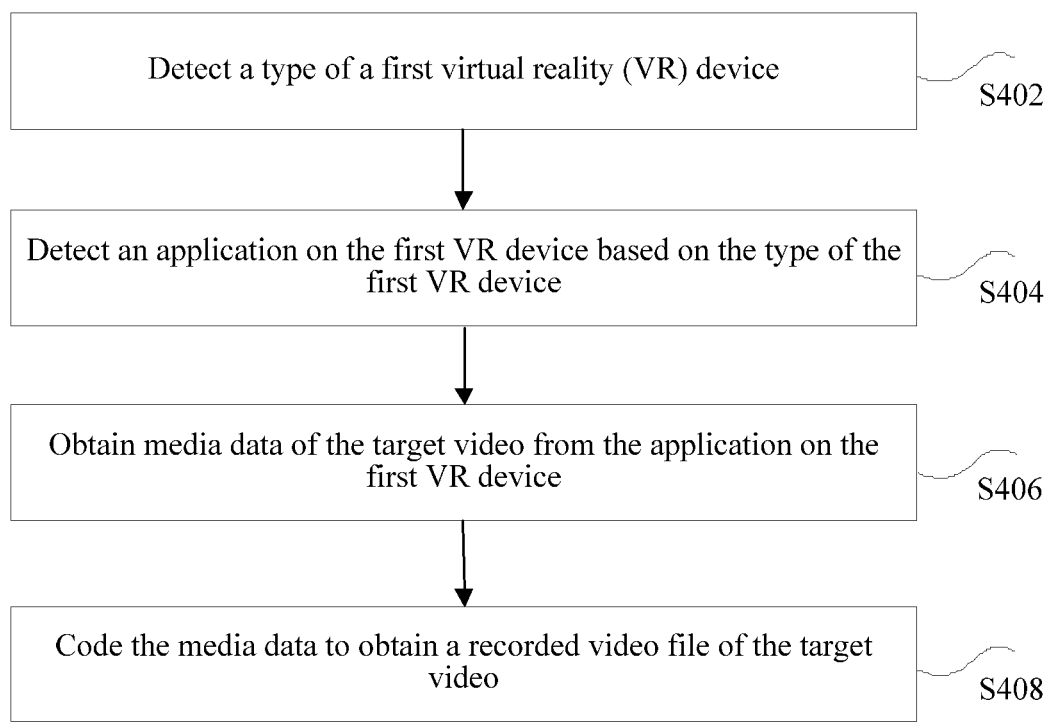
FIG. 4 is a flowchart of a video file processing method according to an embodiment of this application.

FIG. 4 is a flowchart of a video file processing method according to an embodiment of this application. As shown in FIG. 4, the video file processing method may include the following steps:

Step S402: Detect a type of a first VR device.

In this embodiment of this application, the first VR device is used for displaying a to-be-recorded target video.

A VR device is a VR technology-based device that can immerse users into a virtual world. The VR technology can create a computer emulation system by using which a virtual world can be experienced. According to this technology, an emulation system in which there are integrated multi-source information, interactive 3D dynamic visions and entity behaviors is generated by using a computer, so that users are immersed into the environment of the virtual world. The VR device may be a VR HMD on a PC platform.

The first VR device may be detected based on an application program software development kit (SDK) (Platform SDK) of a Windows operating system corresponding to the VR device. A detection plugin system is loaded for detecting the first VR device. For example, an Oculus (a type of VR device) plugin may be loaded for detection. Alternatively, an HTC Vive (a VR device produced by HTC Corporation) plugin may be loaded for detection, so that the type of the first VR device is obtained. Further, the detection plugin system returns the type of the first VR device. The type of the first VR device may be an Oculus type, or may be an HTC Vive type. That is, the first VR device may be an Oculus device, or may be an HTC Vive device.

The first VR device is used for displaying a to-be-recorded target video. The target video is played in the first VR device and is a video to be recorded by a user in a video watching process. The target video may be an entire video played in the first VR device or may be a segment of a video played in the first VR device.

Step S404: Detect an application on the first VR device based on the type of the first VR device.

When the application on the first VR device is detected, a detection logic may be executed based on the detected type of the first VR device. The corresponding detection logic varies as the type of the first VR device varies. The detecting an application on the first VR device based on the type of the first VR device may include: when the type of the first VR device is a first type, starting a preset process to detect a process of the application and window information of the application on the first VR device; or when the type of the first VR device is a second type, invoking an SDK of the first VR device to obtain a process identity (ID), and obtaining the process of the application and the window information of the application on the first VR device based on the process ID; and saving the process of the application and the window information of the application, and loading the application based on the process and the window information of the application.

The preset process is an independent process preset for detecting the type of the first VR device. The preset process may be used for detecting the process of the application and the window information of the application, so that the application may be loaded based on the foregoing information.

The first type and the second type of the first VR device may be distinguished based on whether an application detection-related function is provided in the SDK. For example, when the type of the first VR device is the Oculus type, no application detection-related function is provided in the SDK of the Oculus device, so that the type of the first VR device is the first type. In this case, an independent process needs to be started for detection, to obtain a process name of the application and the window information of the application and save the process name and the window information. When the type of the first VR device is the HTC Vive type, an application detection-related function is provided in the SDK of the HTC Vive device, so that the type of the first VR device is the second type. In this case, the SDK provided in the HTC Vive device needs to be invoked to obtain the process ID, then the process name of the application and the window information of the application are obtained based on the process ID, and finally, the process name of the application and the window information of the application are saved.

After the detecting an application on the first VR device based on the type of the first VR device, the application may be loaded based on the process and the window information of the application.

Step S406: Obtain media data of a target video from the application on the first VR device.

The target video starts to be recorded after the detecting an application on the first VR device based on the type of the first VR device. In the application on the first VR device, the recording process of the target video includes: a capture thread, an audio coding thread, a video coding thread, and the like. The obtaining media data of the target video may be: loading a VR source capture module to the recording process when the target video starts to be recorded. The VR source capture module is configured to: capture a video image of the target video, obtain image data of the target media file based on the video image, and then copy the image data from a target process to a main recording program. The image data of the target media file is a type of media data of the target video. In addition, audio data of the target video may be obtained. The audio data of the target media file is also a type of media data of the target video.

Step S408: Code the media data to obtain (or generate) a recorded video file of the target video, video content of the recorded video file being the same as video content of the target video.

After the media data of the target video is obtained, the media data is coded. The image data and the audio data may be respectively coded to obtain the recorded video file. During actual application, the media data may be coded by using a coding thread of the main program of the application. This includes: coding the image data of the media data by using the video coding thread of the application, and coding the audio data of the media data by using the audio coding thread of the application, to obtain the recorded video file, so that the target video on the first VR device is recorded.

In a possible implementation of this embodiment of this application, after the recorded video file of the target video is obtained by coding the media data, the recorded video file may further be played. A video playback terminal is automatically matched based on different types of the first VR device. The video playback terminal is used for playing the recorded video file. For example, the recorded video file may be played in an HMD matching the type of the first VR device. The HMD includes a PC platform device and a mobile platform device. The HMD may be applied to VR or augmented reality (AR) technology. AR technology is a technology in which a location and an angle affected by a camera are calculated in real time, and corresponding images are added. In this way, a virtual world is mixed with the real world on a screen and interaction can be performed. For another example, the recorded video file may be played in the first VR device again, so that the target video is restored, to obtain visual immersion experienced by a user of watching the video in first person.

According to the foregoing step S402 to step S408, a type of a first VR device is detected, the first VR device being used for displaying a to-be-recorded target video; an application on the first VR device is detected based on the type of the first VR device; media data of the target video is obtained from the application on the first VR device, the media data at least including image data of the target video; and the media data is coded to obtain a recorded video file of the target video, video content of the recorded video file being the same as video content of the target video. In this way, the technology problem that a video displayed in a VR device cannot be recorded by using the related technology is resolved, and the technical effect of recording a video displayed in a VR device is achieved.

In an optional embodiment, in step S406, the obtaining media data of the target video includes: capturing a left-eye video image of the target video and a right-eye video image of the target video, obtaining left-eye image data of the target video based on the left-eye video image, obtaining right-eye image data of the target video based on the right-eye video image; and stitching the left-eye image data and the right-eye image data to obtain the image data of the target video.

Figure 5:
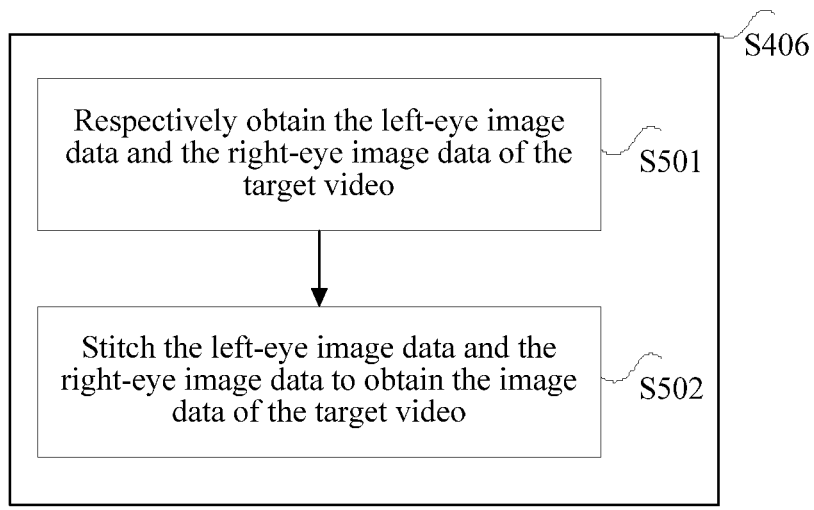
FIG. 5 is a flowchart of a media data coding method according to an embodiment of this application.

FIG. 5 is a flowchart of a media data coding method according to an embodiment of this application. As shown in FIG. 5, the media data coding method includes the following steps:

Step S501: Respectively obtain the left-eye image data and the right-eye image data of the target video.

In the technical solution provided in step S501 of this embodiment of this application, the left-eye video image of the target video and the right-eye video image of the target video may be captured, the left-eye image data of the target video is obtained based on the left-eye video image, and the right-eye image data of the target video is obtained based on the right-eye video image.

The target video includes the left-eye video image watched by using the left eye and the right-eye video image watched by using the right eye. The left-eye image data may be used for displaying the left-eye video image, the right-eye image data may be used for displaying the right-eye video image, and the left-eye image data and the right-eye image data may be respectively obtained based on the left-eye video image and the right-eye video image.

Step S502: Stitch the left-eye image data and the right-eye image data to obtain the image data of the target video.

The coding the media data to obtain a recorded video file of the target video includes: coding the image data to obtain a complete recorded video file and save the recorded video file.

In this embodiment of this application, after the left-eye image data is obtained, a left-eye video file of the recorded video file may be generated based on the left-eye image data, and the left-eye video file is saved, so that the left-eye image data is coded, and the user can watch, by using the left-eye, a left-eye image of the target video corresponding to the left-eye video file. After the right-eye image data is obtained, a right-eye video file of the recorded video file is generated based on the right-eye image data, and the right-eye video file is saved, so that the right-eye image data is coded, and the user can watch, by using the right-eye, a right-eye image of the target video corresponding to the right-eye video file.

In this embodiment, the left-eye image data and the right-eye image data of the target video are respectively obtained, and the left-eye image data and the right-eye image data are stitched to obtain the image data of the target video. In this way, the media data of the target video is obtained.

In an optional embodiment, after the coding the image data to obtain the recorded video file, the method may further include: receiving a first playback instruction instructing to play the left-eye video image, and playing the left-eye video image based on the first playback instruction; and/or receiving a second playback instruction instructing to play the right-eye video image, and playing the right-eye video image based on the second playback instruction.

After the recorded video file of the target video is obtained by coding the media data, the recorded video file is played, that is, the target video is re-shown. The left-eye video image and the right-eye video image may both be selected to be played. Alternatively, only the left-eye video image is selected to be played. Alternatively, only the right-eye video image is selected to be played. This improves flexibility of playing the recorded video file.

In addition, after the left-eye video file and the right-eye video file are saved, the left-eye video file and the right-eye video file may be concurrently played to respectively display the left-eye video image and the right-eye video image, the first playback instruction is received to play the left-eye video file based on the first playback instruction and the second playback instruction is received to play the right-eye video file based on the second playback instruction. Alternatively, only the first playback instruction is received to play the left-eye video file to display the left-eye video image. Alternatively, only the second playback instruction is received to play the right-eye video file to display the right-eye video image. This improves flexibility of playing the recorded video file.

In an optional embodiment, after the coding the media data to obtain a recorded video file of the target video, a video playback terminal matching the first VR device may be determined based on the type of the first VR device, the video playback terminal being used for connecting to the first VR device to obtain and play the recorded video file.

For matching the video playback terminal for playing the recorded video file with the first VR device, the video playback terminal may vary as the type of the first VR device varies. After the coding the media data to obtain a recorded video file of the target video, the video playback terminal matching the first VR device is automatically matched. The video playback terminal is connected to the first VR device to obtain the recorded video file and then play the recorded video file, that is, re-show the target video.

In a possible implementation of this embodiment of this application, to play the recorded video file, the first VR device needs to be detected. The recorded video file may be played by using a common planar device (or two-dimensional display device). Alternatively, the recorded video file may be played by using a VR HMD. For example, the recorded video file is played by using an Oculus HMD playback plugin, or by using an HTC HMD playback plugin, or by using a planar (or two-dimensional) playback plugin. To play the recorded video file, a video decoding module is required for decoding the recorded video file.

In an optional embodiment, the determining a video playback terminal matching the first VR device based on the type of the first VR device includes: determining a planar (or two-dimensional) video playback terminal matching the first VR device based on the type of the first VR device, the planar video playback terminal being used for playing the recorded video file in a 2D form, and the video playback terminal including the planar video playback terminal; or determining a second VR device matching the first VR device based on the type of the first VR device, the second VR device being used for playing the recorded video file in a 3D form, and the video playback terminal including the second VR device.

The video playback terminal is used for playing the recorded video file, and a type of the video playback terminal matches the first VR device, and the video playback terminal includes the planar playback terminal and the second VR device. The planar video playback terminal is a planar 2D video player and is used for playing the recorded video file in a 2D form. The recorded video file may be played by using a planar playback plugin.

The video playback terminal for playing the recorded video file may be the second VR device, for example, an HMD such as a mobile HMD that plays the recorded video file in a 3D form by using an Oculus HMD playback plugin or an HTC HMD playback plugin. The HMD may perform a rendering procedure such as Direct3D11 rendering, Oculus rendering, and HTC rendering. The Oculus rendering includes performing rendering by using an Oculus DK2 Plugin and an Oculus CV1 Plugin.

It should be noted that, the foregoing playback manners of the recorded video file are merely exemplary embodiments of this embodiment of this application, and are not intended to limit this embodiment of this application. All manners capable of playing the recorded video file shall fall within the protection scope of the embodiments of this application and are not listed one by one herein.

In an optional embodiment, the determining a second VR device matching the first VR device based on the type of the first VR device may include: when the recorded video file is saved in the terminal, determining a fixed VR device matching the first VR device based on the type of the first VR device, the second VR device including the fixed VR device.

When the recorded video file is saved in the terminal (for example, a PC), a fixed VR device matching the first VR device is determined based on the type of the first VR device. For example, the first VR device is a PC VR HMD. The target video is recorded when the user watches a VR or panoramic video, or experiences a VR application or a VR game by using the PC VR HMD, and the recorded video file is saved on the PC. The second VR device is a fixed VR device and may also be a PC VR HMD. The target video corresponding to the recorded video file is watched by using the PC VR HMD, so that the user watches a recorded immersive video by using the PC VR HMD, and the second VR device matching the first VR device is determined based on the type of the first VR device.

In an optional embodiment, after the coding the media data to obtain a recorded video file of the target video, the following steps may be further performed: processing the recorded video file to obtain processed data; and sending the processed data to a preset website. The determining a second VR device matching the first VR device based on the type of the first VR device may include: determining a mobile VR device matching the first VR device based on the type of the first VR device, the mobile VR device being used for playing the recorded video file based on the processed data by using the preset web site.

Figure 6:
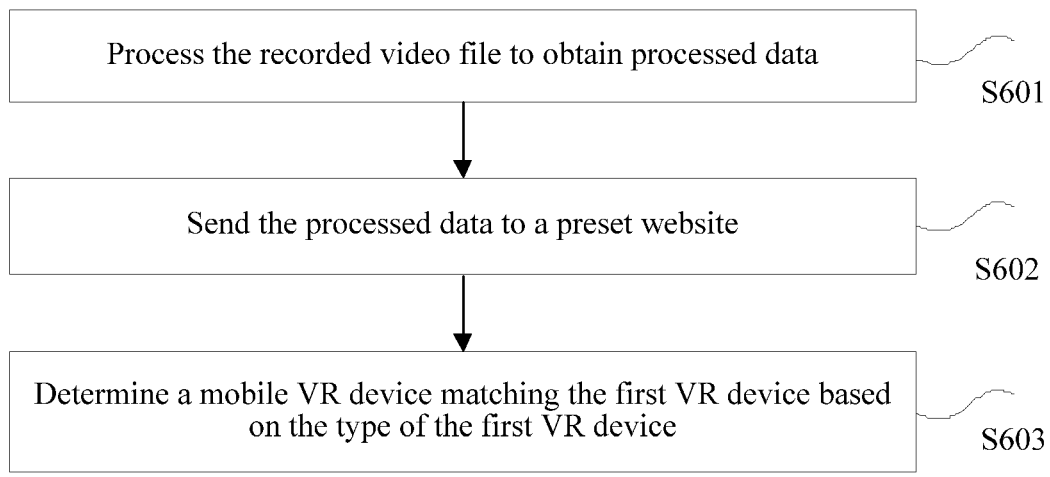
FIG. 6 is a flowchart of another video file processing method according to an embodiment of this application.

FIG. 6 is a flowchart of another video file processing method according to an embodiment of this application. As shown in FIG. 6, the video file processing method includes the following steps:

Step S601: Process the recorded video file to obtain processed data.

After the coding the media data to obtain a recorded video file of the target video, the recorded video file may be processed to obtain processed data.

Step S602: Send the processed data to a preset website.

After the processing the recorded video file to obtain processed data, the processed data is sent to a third party online video website. The preset website includes the third party online video website, so that the recorded video file is shared.

Step S603: Determine a mobile VR device matching the first VR device based on the type of the first VR device.

The mobile VR device is used for playing the recorded video file based on the processed data by using the preset website, and the second VR device includes the mobile VR device.

After the sending the processed data to a preset website, the mobile VR device matching the type of the first VR device may further obtain the processed data from the third party online video website. The mobile VR device may be a pair of mobile VR glasses. The recorded video file is played based on the processed data, so that recorded video file is played.

According to this embodiment, after the coding the media data to obtain a recorded video file of the target video, the processed data obtained by processing the recorded video file is sent to the preset website. The recorded video file is played by using the mobile VR device matching the type of the first VR device based on the processed data by using the preset website, so that the recorded video file is shared and played.

In an optional embodiment, the second VR device may include: an HMD, the HMD being used for playing the recorded video file in a 3D form by using a plugin.

The second VR device includes an HMD, for example, an Oculus HMD and an HTC HMD. The Oculus HMD plays the recorded video file in a 3D form by using an Oculus DK2 Plugin or an Oculus CV1 Plugin.

Figure 7:
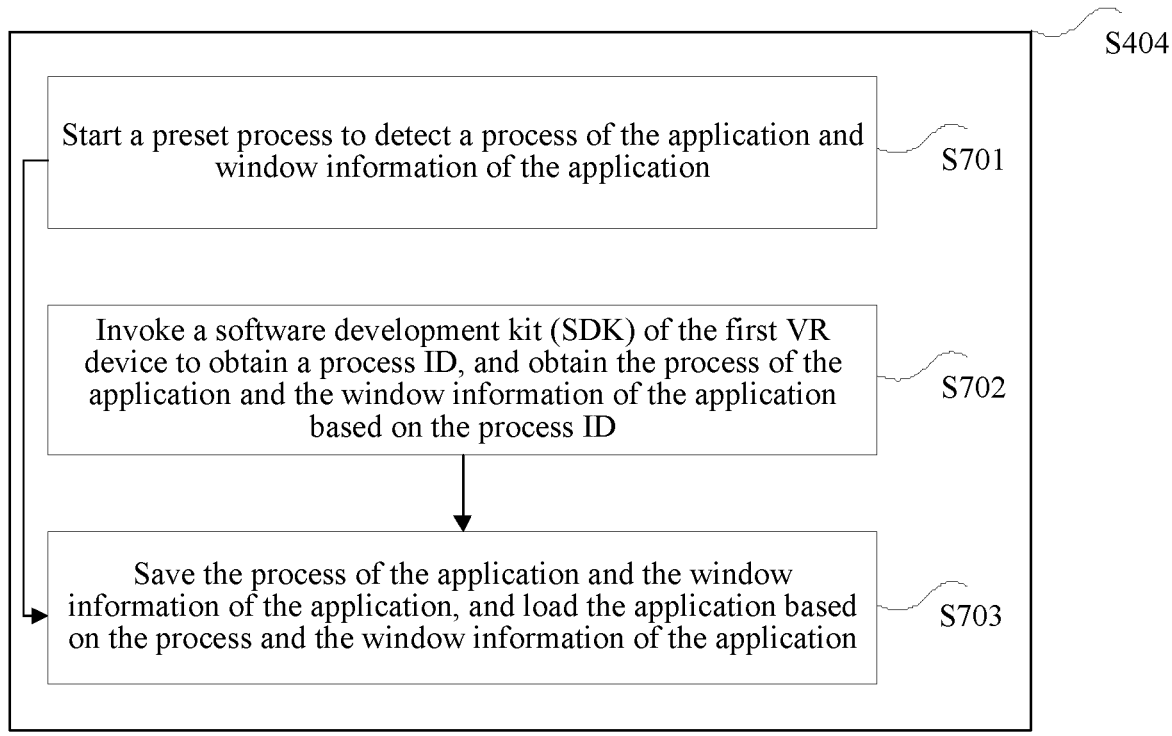
FIG. 7 is a flowchart of a method of detecting an application on a first VR device based on a type of the first VR device according to an embodiment of this application.

FIG. 7 is a flowchart of a method of detecting an application on a first VR device based on a type of the first VR device according to an embodiment of this application. As shown in FIG. 7, the method of detecting an application on a first VR device based on a type of the first VR device includes the following steps:

Step S701: Start a preset process to detect a process of the application and window information of the application.

In the technical solution provided in step S701 of this embodiment of this application, when the type of the first VR device matching the second VR device is a first type, the preset process is started to detect the process of the application and the window information of the application.

The type of the second VR device is an Oculus type. When the type of the first VR device matching the second VR device is Oculus, because no application detection-related function is provided in an SDK of the Oculus second VR device, the preset process is started. The preset process is an independent process for detecting the process of the application on the first VR device.

Step S702: Invoke an SDK of the first VR device to obtain a process ID, and obtain the process of the application and the window information of the application based on the process ID.

In the technical solution provided in step S702 of this embodiment of this application, when the type of the first VR device matching the second VR device is a second type, an SDK of the first VR device is invoked to obtain a process ID, and the process of the application and the window information of the application are obtained based on the process ID.

The type of the second VR device is an HTC Vive type. When the type of the first VR device matching the second VR device is HTC Vive, the SDK of the first VR device needs to be invoked to obtain the process ID, and the process and the window information of the application are obtained based on the process ID.

Step S703: Save the process of the application and the window information of the application, and load the application based on the process and the window information of the application.

After the preset process is started to detect the process of the application and the window information of the application, or after the SDK of the first VR device is invoked to obtain the process ID, and the process of the application and the window information of the application are obtained based on the process ID, the process of the application and the window information of the application are saved, and the process of the application may be saved by saving a process name of the application. The window information of the application includes information about the application such as a window title. The application is loaded based on the process and the window information of the application, so that the application on the first VR device is detected.

According to this embodiment, when the type of the first VR device matching the second VR device is a first type, the preset process is started to detect the process of the application and the window information of the application; or when the type of the first VR device matching the second VR device is a second type, an SDK of the first VR device is invoked to obtain a process ID, and the process of the application and the window information of the application are obtained based on the process ID; the process of the application and the window information of the application are saved, and the application is loaded based on the process and the window information of the application. In this way, the application on the first VR device is detected based on the type of the first VR device.

In an optional embodiment, in step S402, the detecting a type of a first VR device may include: displaying a first preset interface; determining whether a start recording instruction (or start instruction) is received by using the first preset interface, the start recording instruction being used for instructing to start recording the target video; and if it is determined that the start recording instruction is received by using the first preset interface, detecting the type of the first VR device in response to the start recording instruction.

Figure 8:
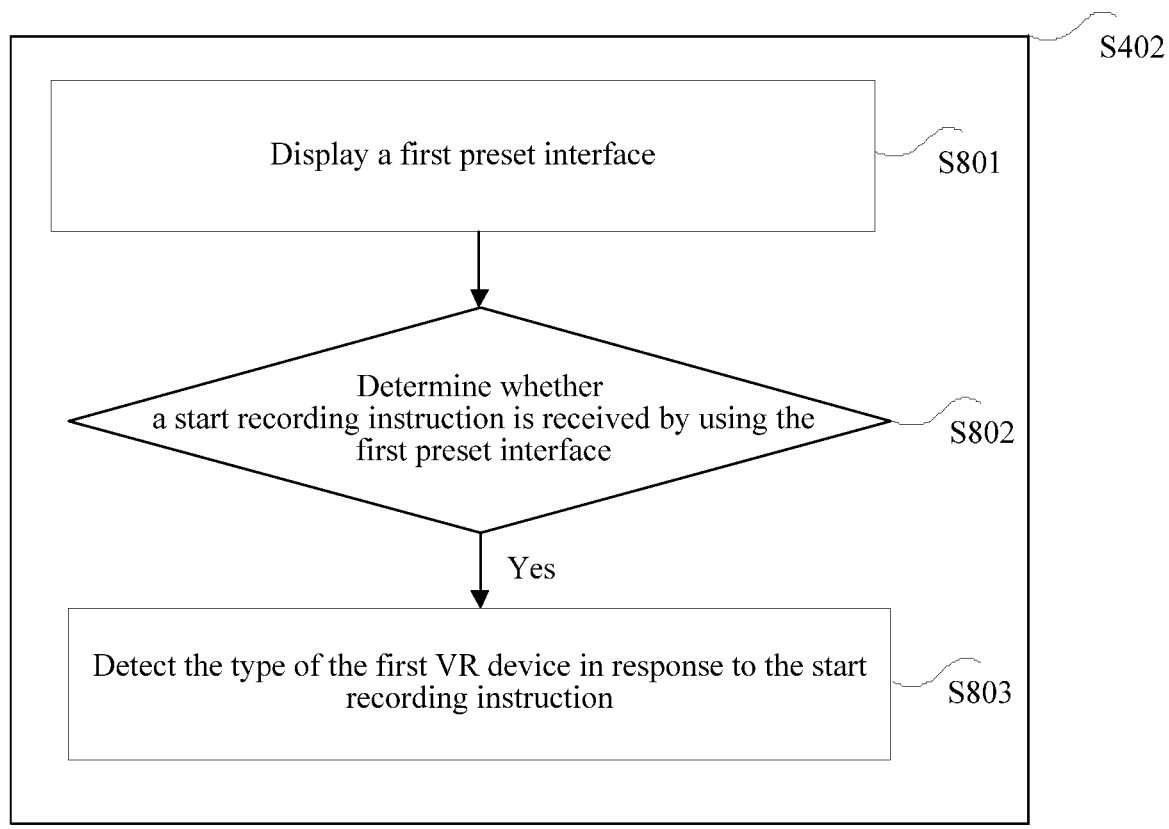
FIG. 8 is a flowchart of a type detecting method of a first VR device according to an embodiment of this application.

FIG. 8 is a flowchart of a type detecting method of a first VR device according to an embodiment of this application. As shown in FIG. 8, the type detecting method of a first VR device includes the following steps:

Step S801: Display a first preset interface.

The first preset interface is an interface used for receiving a start recording instruction instructing to start recording the target video and may include an interface command button.

Step S802: Determine whether a start recording instruction is received by using the first preset interface.

After the first preset interface is displayed, the user may touch the first preset interface to generate the start recording instruction on the first preset interface.

Step S803: Detect the type of the first VR device in response to the start recording instruction.

After it is determined that the start recording instruction is received by using the first preset interface, that is, if the start recording instruction is generated after the user touches the first preset interface, the first VR device is detected in response to the start recording instruction, to detect the type of the first VR device.

According to this embodiment, a first preset interface is determined; whether a start recording instruction is received by using the first preset interface is determined; after it is determined that the start recording instruction is received by using the first preset interface, the type of the first VR device is detected in response to the start recording instruction, so that the type of the first VR device is detected.

In an optional embodiment, in step S802, the determining whether a start recording instruction is received by using the first preset interface includes at least one of the following: determining whether a start recording instruction generated due to that a preset button of the first preset interface is touched is received; or determining whether a start recording instruction generated due to that a keyboard shortcut key of the first preset interface is touched is received; or determining whether a voice command corresponding to a start recording instruction is received by using the first preset interface.

The first preset interface is relatively simple, and may include a plurality of manners for starting recording the target video. The first preset interface may include a preset button. The preset button is an interface command button. A start recording instruction is generated by touching the preset button. Whether a start recording instruction generated due to that the preset button of the first preset interface is touched is received is determined. The first preset interface may correspondingly have a keyboard shortcut key. A start recording instruction is generated by touching the keyboard shortcut key. Whether a start recording instruction generated due to that the keyboard shortcut key of the first preset interface is touched is received is determined. The first preset interface may alternatively identify a start recording instruction by means of voice command input. Whether a voice command corresponding to a start recording instruction is received by using the first preset interface is determined.

It should be noted that, the foregoing manners of starting recording the target video are merely exemplary embodiments of this embodiment of this application, and are not intended to limit this embodiment of this application. All manners capable of starting recording the target video shall fall within the protection scope of the embodiments of this application and are not listed one by one herein.

In an optional embodiment, after the determining whether a start recording instruction used for instructing to start recording the target video is received by using the first preset interface, if it is determined that the start recording instruction is received by using the first preset interface, a recording sign indicating recording of the target video is displayed, the recording sign including a recording sign displayed in a form of animation and/or a recording sign displayed in a form of time.

The recording sign indicating recording of the target video is a recording sign enabling a user to have a feeling of immersion, and may be displayed in an HMD. After the determining whether a start recording instruction used for instructing to start recording the target video is received by using the first preset interface, if it is determined the start recording instruction is received by using the first preset interface, the recording sign may be displayed in a form of animation. For example, a rotating picture may be used for indicating starting recording the target video. Alternatively, the recording sign is displayed in a form of time, for example, a time expression indicating starting counting down.

In an optional embodiment, after the coding the media data to obtain a recorded video file of the target video, the method may further include: after an end recording instruction (end instruction) is received by using a second preset interface, ending recording the target video; and if it is determined that a save instruction is received by using a third preset interface, saving the recorded video file in response to the save instruction.

Figure 9:
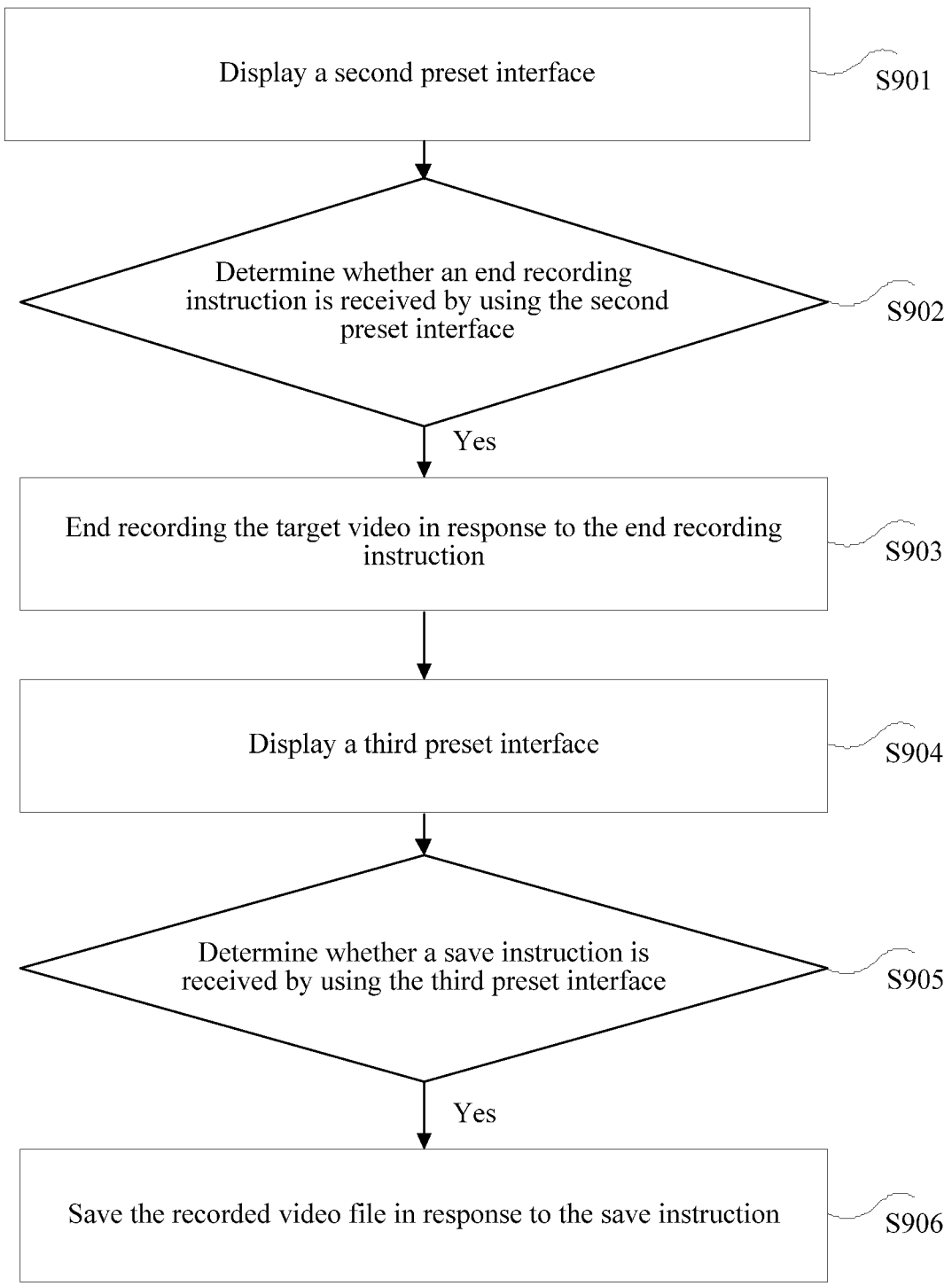
FIG. 9 is a flowchart of another video file processing method according to an embodiment of this application.

FIG. 9 is a flowchart of another video file processing method according to an embodiment of this application. As shown in FIG. 9, the video file processing method further includes the following steps:

Step S901: Display a second preset interface.

The second preset interface is an interface used for receiving an end recording instruction instructing to end recording the target video and may include an interface command button.

Step S902: Determine whether an end recording instruction is received by using the second preset interface, the end recording instruction being used for instructing to end recording the target video.

After the second preset interface is displayed, the user may touch the second preset interface to generate the end recording instruction on the second preset interface.

Step S903: End recording the target video in response to the end recording instruction.

After the determining whether an end recording instruction is received by using the second preset interface, if it is determined that the end recording instruction is received by using the second preset interface, if the end recording instruction is generated due to that the second preset interface is touched by the user, recording of the target video is ended in response to the end recording instruction.

Step S904: Display a third preset interface.

The third preset interface is an interface used for receiving a save instruction instructing to save the target video and may include an interface command button.

Step S905: Determine whether a save instruction is received by using the third preset interface, the save instruction being used for instructing to save the recorded video file.

After the third preset interface is displayed, the user may touch the third preset interface to generate the save instruction on the third preset interface.

Step S906: Save the recorded video file in response to the save instruction.

After the determining whether a save instruction instructing to save the target video is received by using the third preset interface, if the save instruction is generated due to that the third preset interface is touched by the user, the recorded video file is saved in response to the save instruction.

According to this embodiment, after the coding the media data to obtain a recorded video file of the target video, a second preset interface is determined; whether an end recording instruction is received by using the second preset interface is determined; if it is determined that the end recording instruction is received by using the second preset interface, recording of the target video is ended in response to the end recording instruction; a third preset interface is displayed; whether a save instruction is received by using the third preset interface is determined; if it is determined that the save instruction is received by using the third preset interface, the recorded video file is saved in response to the save instruction. In this way, the recording operation of the video displayed in the first VR device is simplified.

In an optional embodiment, in step S902, the receiving an end recording instruction by using the second preset interface includes at least one of the following: determining whether an end recording instruction generated due to that a preset button of the second preset interface is touched is received; or determining whether an end recording instruction generated due to that a keyboard shortcut key of the second preset interface is touched is received; or determining whether a voice command corresponding to an end recording instruction is received by using the second preset interface.

The second preset interface is relatively simple and may include a plurality of operating manners for ending recording the target video. The second preset interface may include a preset button. The preset button is an interface command button. An end recording instruction is generated by touching the preset button. Whether an end recording instruction generated due to that the preset button of the second preset interface is touched is received is determined. The second preset interface may correspondingly have a keyboard shortcut key. An end recording instruction is generated by touching the keyboard shortcut key. Whether an end recording instruction generated due to that the keyboard shortcut key of the second preset interface is touched is received is determined. The second preset interface may alternatively identify an end recording instruction by means of voice command input. Whether a voice command corresponding to an end recording instruction is received by using the second preset interface is determined.

It should be noted that, the foregoing manners of ending recording the recorded video file are merely exemplary embodiments of this embodiment of this application, and are not intended to limit this embodiment of this application. All manners capable of ending recording the recorded video file shall fall within the protection scope of the embodiments of this application and are not listed one by one herein.

In an optional embodiment, in step S905, the determining whether a save instruction is received by using the third preset interface includes at least one of the following: determining whether a save instruction generated due to that a preset button of the third preset interface is touched is received; or determine whether a save instruction generated due to that a keyboard shortcut key of the third preset interface is touched is received; or determining whether a voice command corresponding to a save instruction is received by using the third preset interface.

The third preset interface is relatively simple and may include a plurality of operating manners for saving the target video. The third preset interface may include a preset button. The preset button is an interface command button. A save instruction is generated by touching the preset button. Whether a save instruction generated due to that the preset button of the third preset interface is touched is received is determined. The third preset interface may correspondingly have a keyboard shortcut key. A save instruction is generated by touching the keyboard shortcut key. Whether a save instruction generated due to that the keyboard shortcut key of the third preset interface is touched is received is determined. The third preset interface may alternatively identify a save instruction by means of voice command input. Whether a voice command corresponding to a save instruction is received by using the third preset interface is determined.

It should be noted that, the foregoing manners of saving the recorded video file are merely exemplary embodiments of this embodiment of this application, and are not intended to limit this embodiment of this application. All manners capable of saving the recorded video file shall fall within the protection scope of the embodiments of this application and are not listed one by one herein.

In an optional embodiment, in step S406, the obtaining media data of the target video includes: capturing a video image of the target video of the target video; obtaining image data of the target video based on the video image; and obtaining audio data of the target video.

Figure 10:
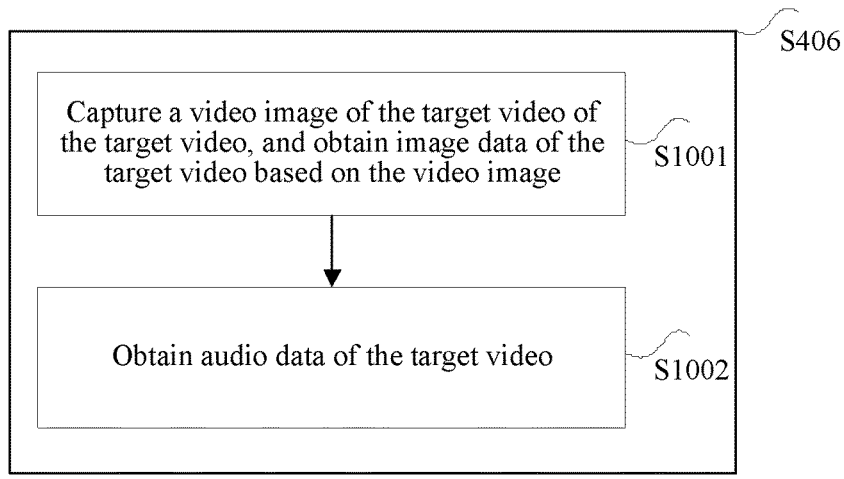
FIG. 10 is a flowchart of a media data obtaining method of a target video according to an embodiment of this application.

FIG. 10 is a flowchart of a media data obtaining method of a target video according to an embodiment of this application. As shown in FIG. 10, the media data obtaining method of a target video includes the following steps:

Step S1001: Capture a video image of the target video of the target video, and obtain image data of the target video based on the video image.

After the application on the first VR device is detected, a video image of the target video is captured from the application on the first VR device, and image data of the target video is obtained based on the video image of the target video.

Step S1002: Obtain audio data of the target video.

The target video includes audio data for playing a sound. After the application on the first VR device is detected, the audio data of the target video is obtained.

It should be noted that, step S1001 and step S1002 may be performed not according to a specific sequence. Step S1001 and step S1002 may be concurrently performed, or step S1001 may be first performed, or step S1002 may be first performed.

After the image data and the audio data are obtained, the image data and the audio data are respectively coded to obtain a recorded video file of the target video, so that the media data is coded to obtain a recorded video file.

In an optional embodiment, after the coding the media data to obtain a recorded video file of the target video, the recorded video file may be saved in the SDK of the first VR device; or the recorded video file is saved in an SDK of a game client; or the recorded video file is saved in an SDK of a game engine.

In this embodiment, a game developer, a game engine developer or a VR hardware developer may save a first person VR video function in an engine SDK, a game SDK and a hardware display SDK.

An embodiment of this application provides a VR video solution in which a left-eye image and a right-eye VR image are recorded and the first person immersion can be perfectly restored, thereby satisfying requirements of VR players to record and experience VR applications and game processes. This embodiment of this application may further be used as a content generation platform focusing on user-generated content (UGC). In this way, VR content on the present phase is increased, and the technical effect of recording a video displayed in a VR device is achieved.

The technical solution of this embodiment of this application is described with reference to an actual application scenario below.

The technical frame of this embodiment of this application is divided into two parts. The first part is a recording process, and the second part is a playback process.

Figure 11:
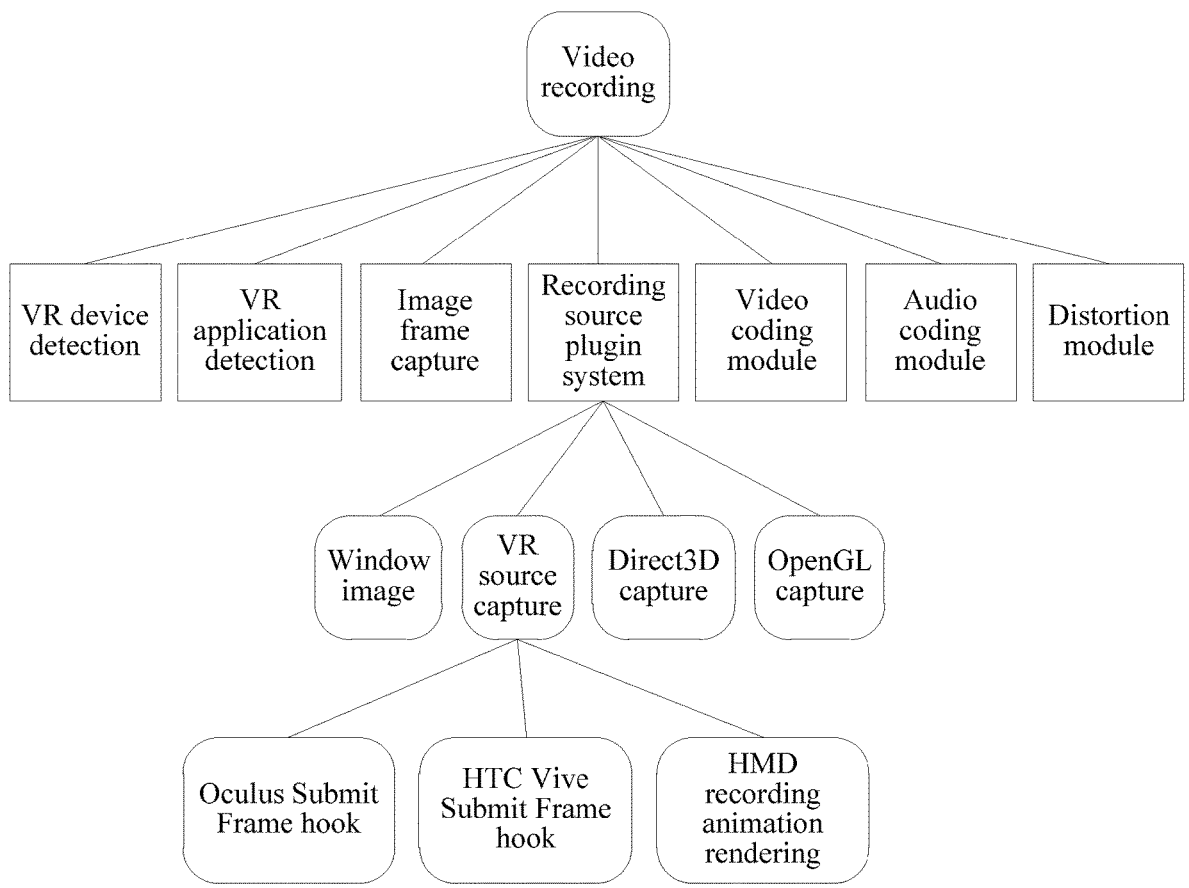
FIG. 11 is a schematic structural diagram of video recording according to an embodiment of this application.

FIG. 11 is a schematic structural diagram of video recording according to an embodiment of this application. As shown in FIG. 11, a target video on a VR device is recorded. This includes VR device detection, VR application detection, image frame capture, a recording source plugin system, a video coding module, an audio coding module, and a distortion module. The VR device detection is used for detecting a type of a VR device. The VR application detection is used for detecting an application on the VR device based on the type of the VR device. The image frame capture is used for capturing an image. The recording source plugin system may be used for recording a Window image, and implementing VR source capture, Direct3D capture, and OpenGL capture. The VR source capture is used for implementing an Oculus Submit Frame hook, an HTC Vive Submit Frame hook, and HMD recording animation rendering. The video coding module is configured to code image data of the target video. The audio coding module is configured to code audio data of the target video. The distortion module is configured to process recorded video file to obtain processed data. The distorted processed data may be shared with a third party online video website to be watched through a pair of mobile VR glasses.

Figure 12:
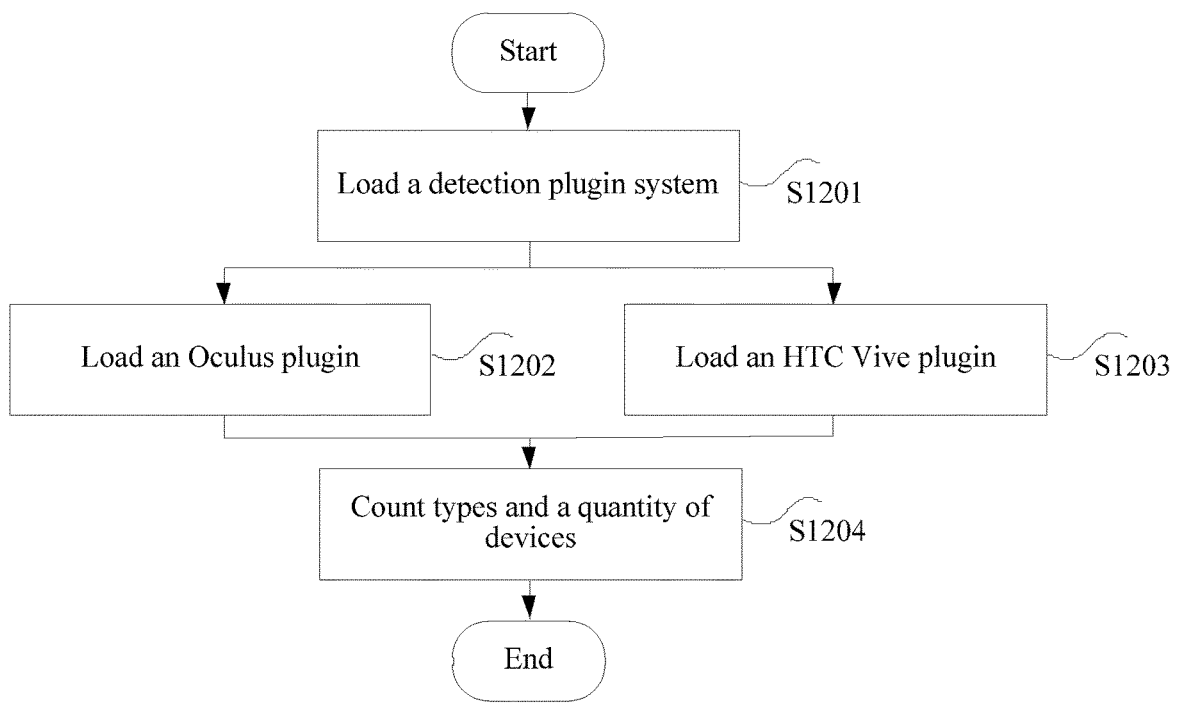
FIG. 12 is a flowchart of a VR device detecting method according to an embodiment of this application.

FIG. 12 is a flowchart of a VR device detecting method according to an embodiment of this application. As shown in FIG. 12, the VR device detecting method includes the following steps:

Step S1201: Load a detection plugin system.

VR device detection is performed first when recording a target video. A main principle of VR device detection is: For each of different VR hardware devices, implementing a detection function based on a platform SDK provided by the hardware device. A detection plugin system is loaded. The plugin system includes an Oculus plugin and an HTC plugin.

Step S1202: Load an Oculus plugin.

An Oculus plugin is loaded if the VR device is an Oculus device, so that detection is performed by using the Oculus plugin.

Step S1203: Load an HTC Vive plugin.

An HTC Vive plugin is loaded if the VR device is an HTC Vive device, so that detection is performed by using the HTC Vive plugin.

Step S1204: Count types and a quantity of devices.

After the Oculus plugin is loaded and detection is performed by using the Oculus plugin, or after the HTC Vive plugin is loaded and detection is performed by using the HTC Vive plugin, types and a quantity of devices are counted.

After the types and the quantity of the devices are counted, the types of the VR devices are returned.

Figure 13:
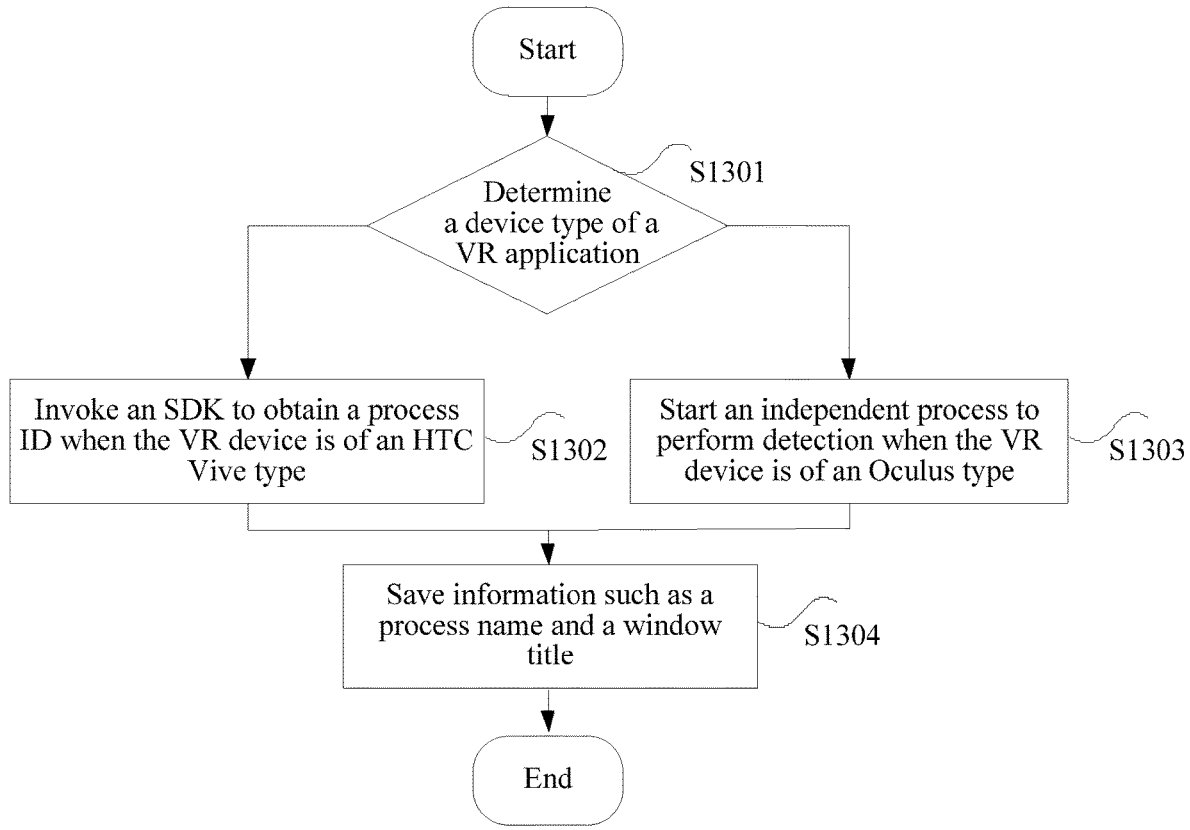
FIG. 13 is a flowchart of a VR application detecting method according to an embodiment of this application.

FIG. 13 is a flowchart of a VR application detecting method according to an embodiment of this application. As shown in FIG. 13, the VR application detecting method includes the following steps:

Step S1301: Determine a device type of a VR application.

When the VR application is detected, different detection logics are respectively executed based on different VR devices that are detected.

Step S1302: Invoke an SDK to obtain a process ID when the VR device is of an HTC Vive type.

For detection of the application run on the HTC Vive device, an SDK provided by the HTC Vive device needs to be invoked to obtain a process ID, and then a process and window information are obtained based on the process ID.

Step S1303: Start an independent process to perform detection when the VR device is of an Oculus type.

For detection of the application run on the Oculus device, because no related function is provided in an SDK of the Oculus device, an independent process needs to be started to perform detection.

Step S1304: Save information such as a process name and a window title.

Figure 14:
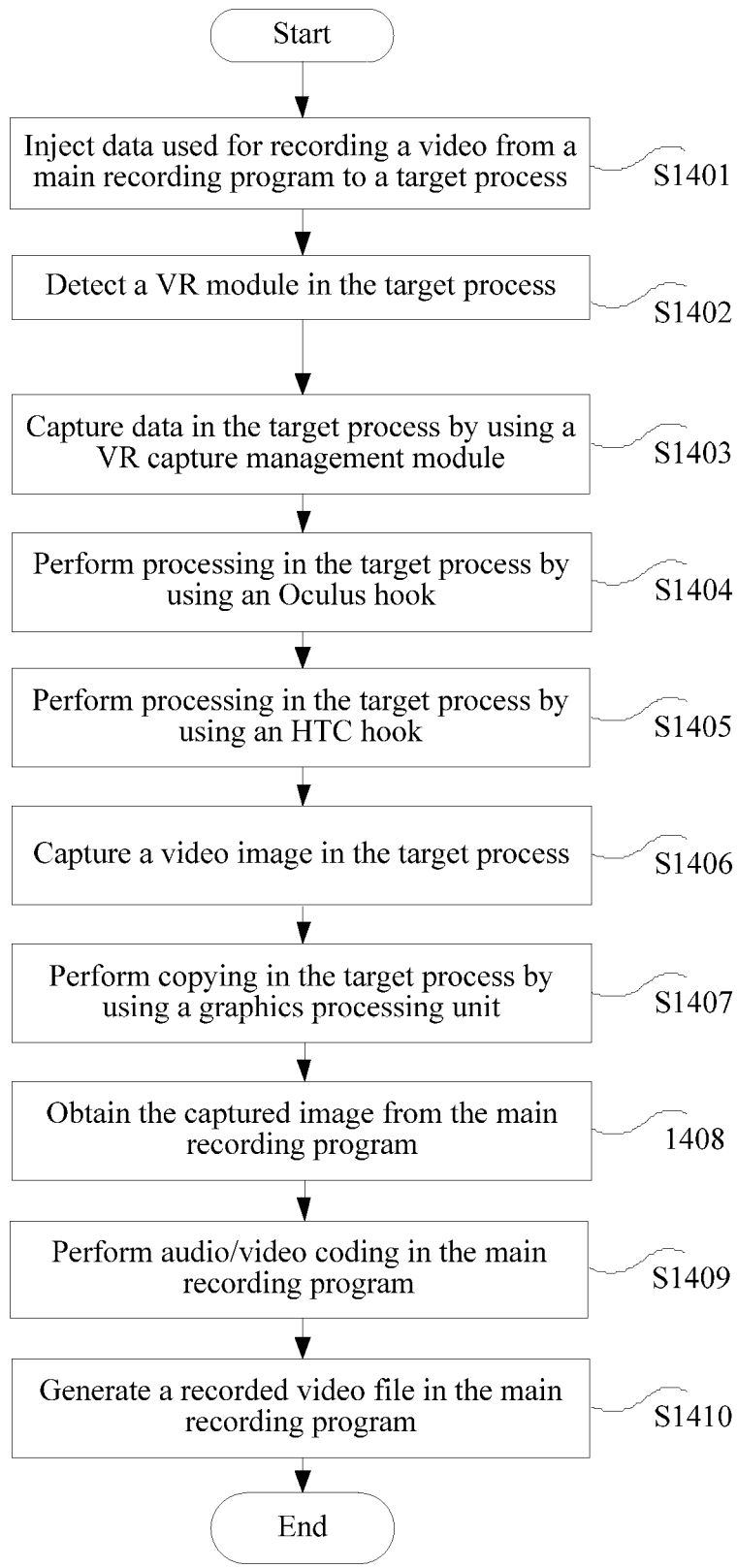
FIG. 14 is a flowchart of another video file processing method according to an embodiment of this application.

FIG. 14 is a flowchart of another video file processing method according to an embodiment of this application. As shown in FIG. 14, the video file processing method includes the following steps:

Step S1401: Inject data used for recording a video from a main recording program to a target process.

Step S1402: Detect a VR module in the target process.

Step S1403: Capture data in the target process by using a VR capture management module.

Step S1404: Perform processing in the target process by using an Oculus hook.

The captured data is processed by using the Oculus hook.

Step S1405: Perform processing in the target process by using an HTC hook.

The captured data is processed by using the HTC hook.

Step S1406: Capture a video image in the target process.

The video image is captured by using the processed data, to obtain image data.

Step S1407: Perform copying in the target process by using a graphics processing unit.

The image data is copied to the main recording program by using the graphics processing unit.

Step S1408: Obtain the captured image from the main recording program.

The image data is obtained from the main recording program to obtain the captured image.

Step S1409: Perform audio/video coding in the main recording program.

Audio/video coding is performed on a video file corresponding to the captured image.

Step S1410: Generate a recorded video file in the main recording program.

A video recording procedure is relatively complex and is mainly divided into a capture thread, an audio coding thread, and a video coding thread. A corresponding VR source capture module responsible for capturing a VR left-eye/right-eye image is injected to a recording process when recording is started. Then, image data is copied by using a GPU texture copy method from a target process to a main recording program, and a coding thread of the main program performs audio/video coding, to generate a video file. In this way, the technical effect of recording a video displayed in a VR device is achieved.

After the recorded video file is generated, an HMD is automatically matched with VR hardware based on different VR hardware, so that the recorded video file is played in a corresponding HMD.

Figure 15:
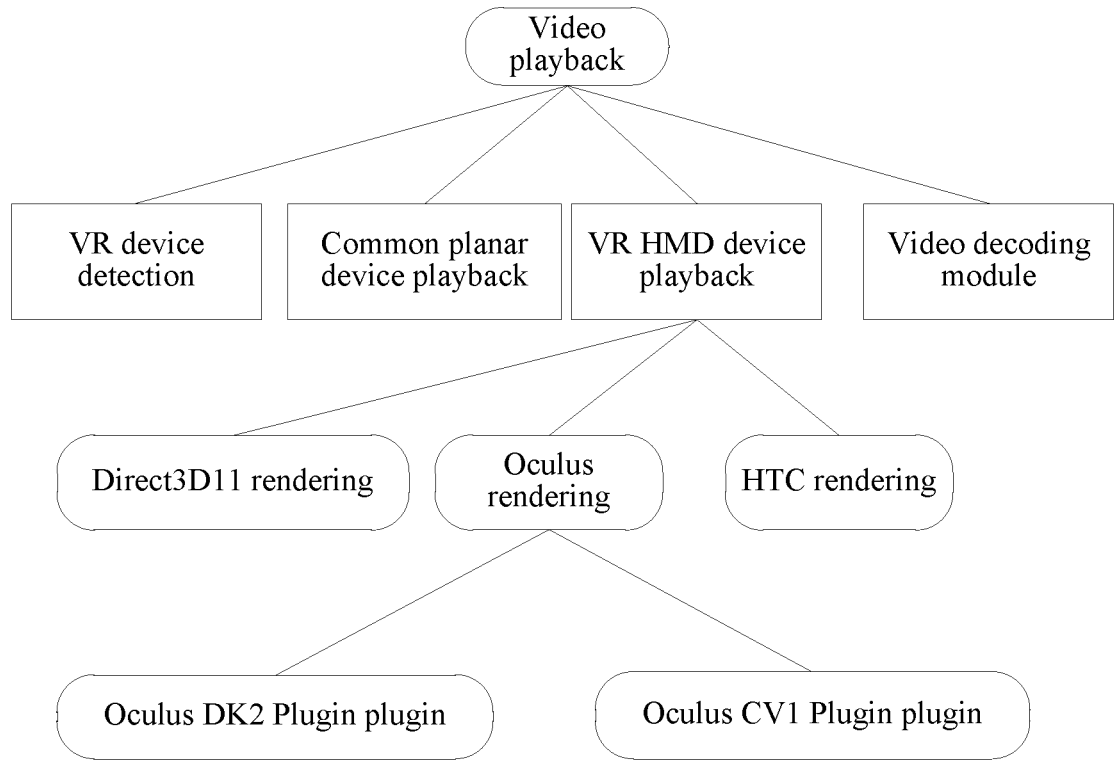
FIG. 15 is a schematic diagram of a frame of a video player according to an embodiment of this application.

FIG. 15 is a schematic diagram of a frame of a video player according to an embodiment of this application. As shown in FIG. 15, the video player may implement the following: VR device detection, common planar device playback, VR HMD device playback, and a video decoding module. The VR HMD device playback is HMD playback and is mainly divided into three plugin modules: a planar playback plugin module, an Oculus HMD playback plugin module, and an HTC HMD playback plugin module. This application is not limited to the three types of HMD plugins. Other subsequent hardware HMD playback may also use such a frame. The VR HMD may be used for implementing Direct3D rendering, Oculus rendering, and HTC rendering. The Oculus rendering includes an Oculus DK2 Plugin and an Oculus CV1 Plugin.

This embodiment provides a VR video solution in which a left-eye image and a right-eye VR image are recorded and the first person immersion can be perfectly restored, thereby satisfying requirements of VR players to record and experience VR applications and game processes. This embodiment of this application may further be used as a content generation platform focusing on UGC. In this way, VR content on the present phase is increased.

In this embodiment, a game developer, a game engine developer or a VR hardware developer may save a first person VR video function in an engine SDK, a game SDK and a hardware display SDK.

For an application environment of this embodiment of this application, reference may be made but is not limited to the application environment of the foregoing embodiment. This is not described in detail in this embodiment. An embodiment of this application provides an optional exemplary application for performing the foregoing video file processing method.

This embodiment of this application is applicable to a plurality of types of VR experiencing scenarios. This embodiment of this application includes but is not limited to the following aspects:

First: A user having a PC VR HMD may record, when watching a VR or panoramic video, or experiencing a VR application or a VR game, an entire process by using the method provided in this embodiment of this application.

Second: A user having a mobile VR HMD may watch, by using the method provided in this embodiment of the present disclosure, an immersive video recorded by other users.

Third: A user not having a VR HMD may directly play an already recorded video by using the method in this embodiment of the present invention disclosure, may select to concurrently watch a left-eye video image and a right-eye video image, or may watch only a left-eye video image or a right-eye video image.

By means of this embodiment of this application, an image in the PC VR HMD can be recorded and saved in a left-eye/right-eye video format, and the recorded video may be played in the HMD again, thereby restoring the first person visual immersion.

Figure 16:
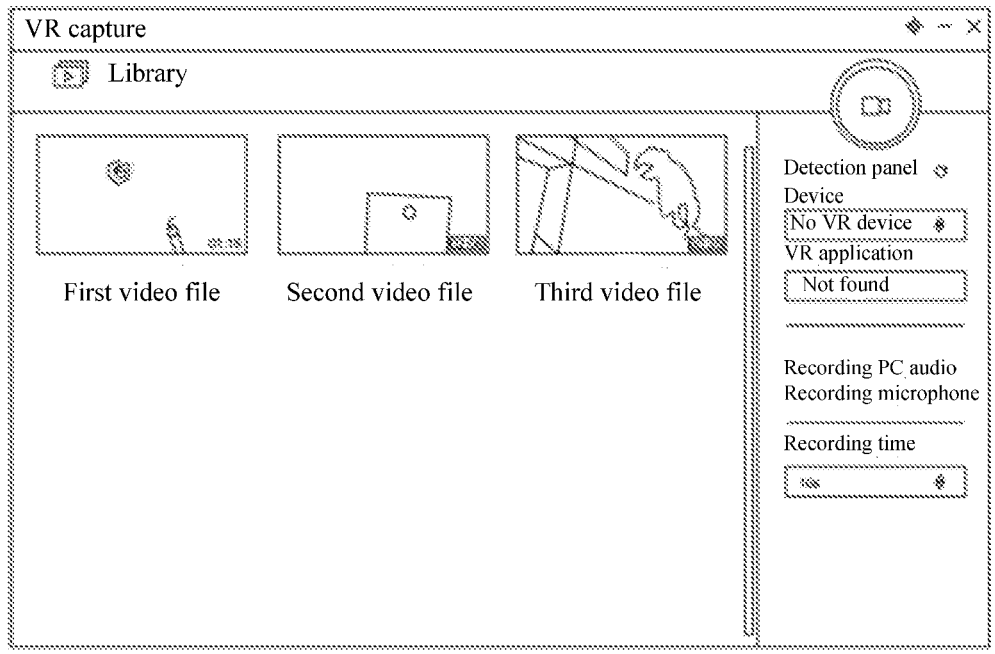
FIG. 16 is a schematic diagram of a video recording interface according to an embodiment of this application.

FIG. 16 is a schematic diagram of a video recording interface according to an embodiment of this application. As shown in FIG. 16, recording and playback of a product are easy. A plurality of operations may be used for starting and ending recording. This includes but is not limited to use of an interface command button or a keyboard shortcut key, or by means of voice command input identification, or the like. The interface command button is a start recording button shown at an upper right corner of FIG. 16. When a user touches the start recording button, a target video starts to be recorded. When the target video is recorded, an immersive recording sign is displayed in an HMD and includes but is not limited to a recording animation, a time display, or the like. Already recorded video files such as a first video file, a second video file and a third video file are displayed on a video recording interface. A detection panel is on the right of the recording interface and includes: device, VR application, recording PC audio, recording microphone, recording time, and the like. In this way, the technical effect of recording a video displayed in a VR device is achieved.

Figure 17:
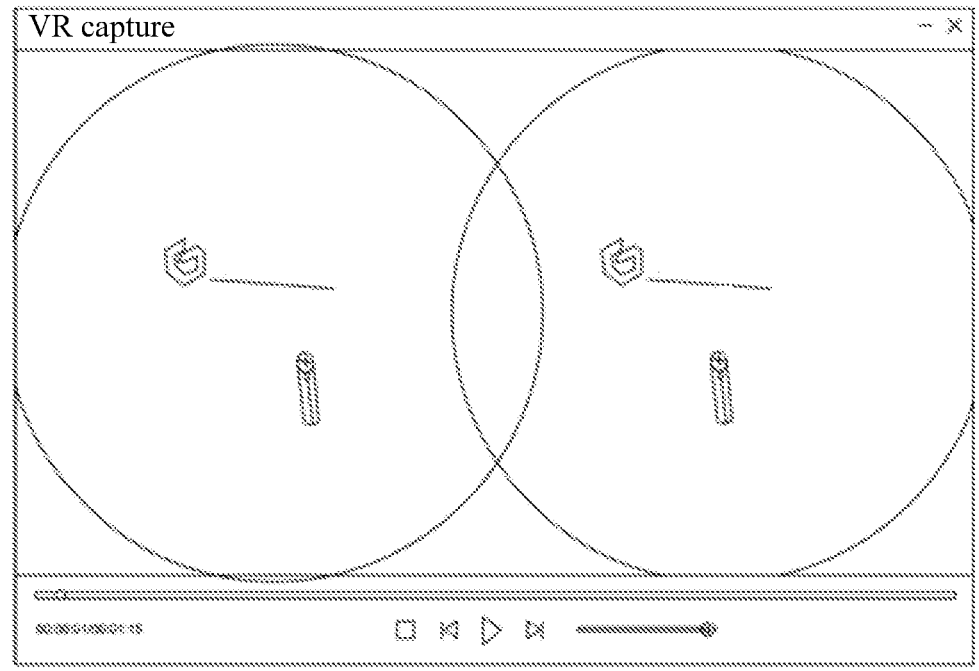
FIG. 17 is a schematic diagram of a video playback interface according to an embodiment of this application.

FIG. 17 is a schematic diagram of a video playback interface according to an embodiment of this application. As shown in FIG. 17, a video player may select to play a planar 2D video, or may select a VR video played in an HMD. A user not having a VR HMD may directly play an already recorded video by using the method in this embodiment of the present disclosure, may select to concurrently watch a left-eye video image and a right-eye video image, or may watch only a left-eye video image or a right-eye video image. A video playback progress and playback time are shown on the lower part of a video playback interface. Four interface buttons on the lower part of the video playback interface may respectively correspond to an exit operation, a rewind operation, a playback/pause operation, and a forward operation of video playback, so that a recorded video is played.

It should be noted that the foregoing method embodiments are expressed as a series of action combinations for the purpose of brief description, but a person skilled in the art should know that because some steps may be performed in other sequences or simultaneously according to the embodiments of this application, the embodiments of this application are not limited to a described action sequence. In addition, a person skilled in the art should also know that the embodiments described in the specification are all exemplary embodiments. Therefore, an action and a module described are not necessarily mandatory in the embodiments of this application.

By means of description of the foregoing implementation, a person skilled in the art may clearly learn that the method in the foregoing embodiment may be implemented by relying on software and a necessary common hardware platform or by using hardware, but the former one is an exemplary implementation in many cases. Based on such an understanding, the technical solutions in the embodiments of this application essentially or the part contributing to the existing technology may be implemented in a form of a software product. The computer software product is stored in a storage medium (such as a read-only memory (ROM)/random access memory (RAM), a magnetic disk, or an optical disk), and includes several instructions for instructing a terminal device (which may be a mobile phone, a computer, a server, a network device, and the like) to perform the method described in the embodiments of this application.

Figure 18:
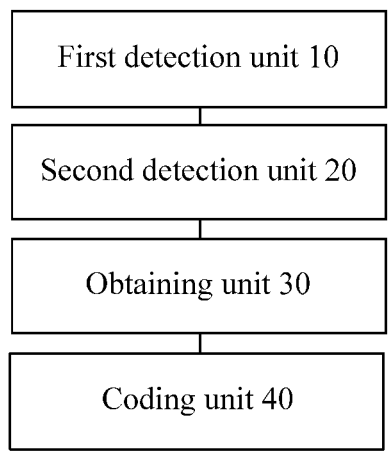
FIG. 18 is a schematic diagram of a video file processing apparatus according to an embodiment of this application.

According to an embodiment of this application, a video file processing apparatus for performing the foregoing video file processing method is further provided. FIG. 18 is a schematic diagram of a video file processing apparatus according to an embodiment of this application. As shown in FIG. 18, the video file processing apparatus may include: a first detection unit 10, a second detection unit 20, an obtaining unit 30, and a coding unit 40.

The first detection unit 10 is configured to detect a type of a first VR device, the first VR device being used for displaying a to-be-recorded target video.

The second detection unit 20 is configured to detect an application on the first VR device based on the type of the first VR device.

The obtaining unit 30 is configured to obtain media data of the target video from the application on the first VR device.

The coding unit 40 is configured to code the media data to obtain a recorded video file of the target video, video content of the recorded video file being the same as video content of the target video.

In a possible implementation of this embodiment of this application, the obtaining unit 30 may include: a capture module and a first obtaining module. The capture module is configured to: capture a video image of the target video, and obtain image data of the target video based on the video image. The first obtaining module is configured to obtain audio data of the target video.

The coding unit is configured to respectively code the image data and the audio data to obtain the recorded video file of the target video.

In a possible implementation of this embodiment of this application, the obtaining unit 30 may include: a second obtaining module and a stitching module. The second obtaining module is configured to: capture a left-eye video image of the target video and a right-eye video image of the target video, obtain left-eye image data of the target video based on the left-eye video image, and obtain right-eye image data of the target video based on the right-eye video image. The stitching module is configured to stitch the left-eye image data and the right-eye image data to obtain the image data of the target video.

The coding unit is configured to code the image data to obtain the recorded video file.

In a possible implementation of this embodiment of this application, the video file processing apparatus may further include: a first playback unit and/or a second playback unit. The first playback unit is configured to: receive a first playback instruction instructing to play the left-eye video image, and play the left-eye video image based on the first playback instruction. The second playback unit is configured to: receive a second playback instruction instructing to play the right-eye video image, and play the right-eye video image based on the second playback instruction.

In a possible implementation of this embodiment of this application, the video file processing apparatus may further include a determining unit, configured to: after the coding the media data to obtain a recorded video file of the target video, determine a video playback terminal matching the first VR device based on the type of the first VR device, the video playback terminal being used for connecting to the first VR device to obtain and play the recorded video file.

In a possible implementation of this embodiment of this application, the determining unit is configured to determine a planar video playback terminal matching the first VR device based on the type of the first VR device, the planar video playback terminal being used for playing the recorded video file in a 2D form, and the video playback terminal including the planar video playback terminal.

In a possible implementation of this embodiment of this application, the determining unit is configured to determine a second VR device matching the first VR device based on the type of the first VR device, the second VR device being used for playing the recorded video file in a 3D form, and the video playback terminal including the second VR device.

In a possible implementation of this embodiment of this application, the determining unit is configured to: when the recorded video file is saved in the terminal, determine a fixed VR device matching the first VR device based on the type of the first VR device, the second VR device including the fixed VR device.

In a possible implementation of this embodiment of this application, the video file processing apparatus may further include a processing unit, configured to: after the coding the media data to obtain a recorded video file of the target video, process the recorded video file to obtain processed data, and send the processed data to a preset website. The determining unit is configured to: determine a mobile VR device matching the first VR device based on the type of the first VR device, the mobile VR device being used for playing the recorded video file based on the processed data by using the preset website, and the second VR device including the mobile VR device.

In a possible implementation of this embodiment of this application, the second VR device includes an HMD, the HMD being used for playing the recorded video file in a 3D form by using a plugin.

In a possible implementation of this embodiment of this application, the second detection unit 20 may include: a detection module or an invoking module, and a first save module. The detection module is configured to: when the type of the first VR device is a first type, start a preset process to detect a process of the application and window information of the application on the first VR device; or the invoking module is configured to: when the type of the first VR device is a second type, invoke an SDK of the first VR device to obtain a process ID, and obtain the process of the application and the window information of the application on the first VR device based on the process ID; and a save module, configured to: save the process of the application and the window information of the application, and load the application based on the process and the window information of the application.

In a possible implementation of this embodiment of this application, the first detection unit 10 may include: a first display module, a determining module, and a response module. The first display module is configured to display a first preset interface. The determining module is configured to determine whether a start recording instruction is received by using the first preset interface, the start recording instruction being used for instructing to start recording the target video. The response module is configured to: if it is determined that the start recording instruction is received by using the first preset interface, detect the type of the first VR device in response to the start recording instruction.

In a possible implementation of this embodiment of this application, the determining module is configured to: determine whether a start recording instruction generated due to that a preset button of the first preset interface is touched is received; or determine whether a start recording instruction generated due to that a keyboard shortcut key of the first preset interface is touched is received; or determining whether a voice command corresponding to a start recording instruction is received by using the first preset interface.

In a possible implementation of this embodiment of this application, the first detection unit 10 may further include a second display module, configured to: after the determining whether a start recording instruction used for instructing to start recording the target video is received by using the first preset interface, if it is determined that the start recording instruction is received by using the first preset interface, display a recording sign indicating recording of the target video, the recording sign including a recording sign displayed in a form of animation and/or a recording sign displayed in a form of time.

In a possible implementation of this embodiment of this application, the video file processing apparatus further includes: a first display unit, a first judging unit, and a first response unit. The first display unit is configured to: after the coding the media data to obtain a recorded video file of the target video, display a second preset interface. The first judging unit is configured to determine whether an end recording instruction is received by using the second preset interface, the end recording instruction being used for instructing to end recording the target video. The first response unit is configured to: if it is determined that the end recording instruction is received by using the second preset interface, end recording the target video in response to the end recording instruction.

In a possible implementation of this embodiment of this application, the first judging unit is configured to: determine whether an end recording instruction generated due to that a preset button of the second preset interface is touched is received; or determine whether an end recording instruction generated due to that a keyboard shortcut key of the second preset interface is touched is received; or determine whether a voice command corresponding to an end recording instruction is received by using the second preset interface.

In a possible implementation of this embodiment of this application, the video file processing apparatus further includes: a second display unit, a second judging unit, and a second response unit. The second display unit is configured to: after the coding the media data to obtain a recorded video file of the target video, display a third preset interface. The second judging unit is configured to determine whether a save instruction is received by using the third preset interface, the save instruction being used for instructing to save the recorded video file. The second response unit is configured to: if it is determined that the save instruction is received by using the third preset interface, save the recorded video file in response to the save instruction.

In a possible implementation of this embodiment of this application, the second judging unit is configured to: determine whether a save instruction generated due to that a preset button of the third preset interface is touched is received; or determine whether a save instruction generated due to that a keyboard shortcut key of the third preset interface is touched is received; or determine whether a voice command corresponding to a save instruction is received by using the third preset interface.

In a possible implementation of this embodiment of this application, the video file processing apparatus may further include: a first save unit, or a second save unit, or a third save unit. The first save unit is configured to: after the coding the media data to obtain a recorded video file of the target video, save the recorded video file in the SDK of the first VR device. The second save unit is configured to: after the coding the media data to obtain a recorded video file of the target video, save the recorded video file in an SDK of a game client. The third save unit is configured to: after the coding the media data to obtain a recorded video file of the target video, save the recorded video file in an SDK of a game engine.

It should be noted that, the first detection unit 10 in this embodiment may be configured to perform step S402 in the foregoing embodiment of this application, the second detection unit 20 in this embodiment may be configured to perform step S404 in the foregoing embodiment of this application, the obtaining unit 30 in this embodiment may be configured to perform step S406 in the foregoing embodiment of this application, and the coding unit 40 in this embodiment may be configured to perform step S408 in the foregoing embodiment of this application.

It should be noted that, examples and application scenarios of the foregoing units and modules are the same as those implemented in the corresponding steps, but are not limited to the content disclosed in the foregoing embodiment. It should be noted that, the modules as a part of the apparatus may run in the terminal of the hardware environment shown in FIG. 3, and may be implemented by software, or may be implemented by hardware.

In this embodiment, the first detection unit 10 detects a type of a first VR device, the first VR device being used for displaying a to-be-recorded target video; the second detection unit 20 detects an application on the first VR device based on the type of the first VR device; the obtaining unit 30 obtains media data of the target video from the application on the first VR device; and the coding unit 40 codes the media data to obtain a recorded video file of the target video, video content of the recorded video file being the same as video content of the target video. In this way, the technology problem that a video displayed in a VR device cannot be recorded by using the related technology may be resolved, and the technical effect of recording a video displayed in a VR device is achieved.

According to an embodiment of this application, a server or a terminal for performing the foregoing video file processing method is further provided.

Figure 19:
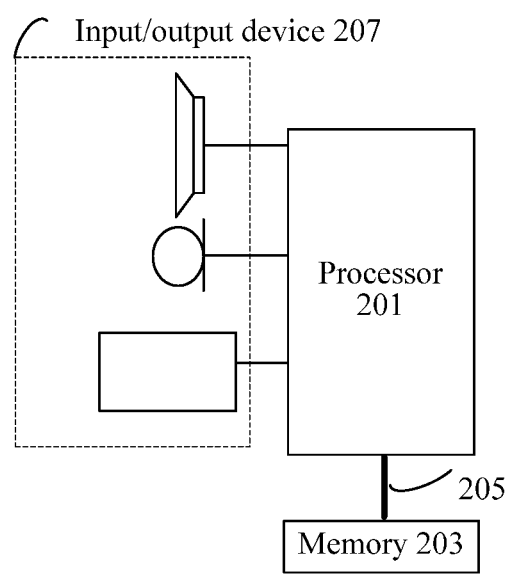
FIG. 19 is a structural block diagram of a terminal according to an embodiment of this application.

FIG. 19 is a structural block diagram of a terminal according to an embodiment of this application. As shown in FIG. 19, the terminal may include: one or more (only one is shown in the figure) processors 201, a memory 203, and a transmission apparatus 205. As shown in FIG. 19, the terminal may further include an input/output device 207.

The memory 203 may be configured to store a software program and module, for example, program instructions/modules corresponding to the video file processing method and apparatus in the embodiments of this application. The processor 201 runs the software program and module in the memory 203 to implement various function application and data processing, that is, implement the foregoing video file processing method. The memory 203 may include a high-speed random memory, and may further include a non-volatile memory such as one or more magnetic storage apparatuses, a flash, or another non-volatile solid-state memory. In some instances, the memory 203 may further include memories remotely disposed relative to the processor 201, and the memory may be connected to the terminal through a network. Instances of the network include, but are not limited to, the Internet, an intranet, a local area network, a mobile communications network, and a combination thereof.

The foregoing transmission apparatus 205 is configured to receive or send data by using a network, and may further be configured to process data transmission between the processor and the memory. Examples of the foregoing network may include a wired network and a wireless network. In an example, the transmission apparatus 205 includes a network adapter (Network Interface Controller, NIC). The network adapter may be connected to another network device and a router by using a network cable, so as to perform communication with the Internet or a local network. In an example, the transmission apparatus 205 is a radio frequency (RF) module, and is configured to communicate with the Internet in a wireless manner.

For example, the memory 203 is configured to store an application program.

The processor 201 may invoke, by using the transmission apparatus 205, the application program stored in the memory 203, to perform the following steps:

detecting a type of a first VR device, the first VR device being used for displaying a to-be-recorded target video;

detecting an application on the first VR device based on the type of the first VR device;

obtaining media data of the target video from the application on the first VR device; and coding the media data to obtain a recorded video file of the target video, video content of the recorded video file being the same as video content of the target video.

The processor 201 may further be configured to perform the following steps: capturing a video image of the target video of the target video; obtaining image data of the target video based on the video image; obtaining audio data of the target video; and respectively coding the image data and the audio data to obtain the recorded video file.

The processor 201 may further be configured to perform the following steps: capturing a left-eye video image of the target video and a right-eye video image of the target video, obtaining left-eye image data of the target video based on the left-eye video image, obtaining right-eye image data of the target video based on the right-eye video image; stitching the left-eye image data and the right-eye image data to obtain the image data of the target video; and coding the image data to obtain the recorded video file.

The processor 201 may further be configured to perform the following steps: after the coding the image data to obtain the recorded video file, receiving a first playback instruction instructing to play the left-eye video image, and playing the left-eye video image based on the first playback instruction; and/or receiving a second playback instruction instructing to play the right-eye video image, and playing the right-eye video image based on the second playback instruction.

The processor 201 may further be configured to perform the following step: after the coding the media data to obtain a recorded video file of the target video, determining a video playback terminal matching the first VR device based on the type of the first VR device, the video playback terminal being used for connecting to the first VR device to obtain and play the recorded video file.

The processor 201 may further be configured to perform the following step: determining a planar video playback terminal matching the first VR device based on the type of the first VR device, the planar video playback terminal being used for playing the recorded video file in a 2D form, and the video playback terminal including the planar video playback terminal.

The processor 201 may further be configured to perform the following step: determining a second VR device matching the first VR device based on the type of the first VR device, the second VR device being used for playing the recorded video file in a 3D form, and the video playback terminal including the second VR device.

The processor 201 may further be configured to perform the following step: when the recorded video file is saved in the terminal, determining a fixed VR device matching the first VR device based on the type of the first VR device, the second VR device including the fixed VR device.

The processor 201 may further be configured to perform the following steps: after the coding the media data to obtain a recorded video file of the target video, processing the recorded video file to obtain processed data; sending the processed data to a preset website, and determining a mobile VR device matching the first VR device based on the type of the first VR device, the mobile VR device being used for playing the recorded video file based on the processed data by using the preset website, and the second VR device including the mobile VR device.

The processor 201 may further be configured to perform the following steps: when the type of the first VR device is a first type, starting a preset process to detect a process of the application and window information of the application on the first VR device; or when the type of the first VR device is a second type, invoking an SDK of the first VR device to obtain a process ID, and obtaining the process of the application and the window information of the application on the first VR device based on the process ID; and saving the process of the application and the window information of the application, and loading the application based on the process and the window information of the application.

The processor 201 may further be configured to perform the following steps: displaying a first preset interface; determining whether a start recording instruction is received by using the first preset interface, the start recording instruction being used for instructing to start recording the target video; and if it is determined that the start recording instruction is received by using the first preset interface, detecting the type of the first VR device in response to the start recording instruction.

The processor 201 may further be configured to perform the following steps: determining whether a start recording instruction generated due to that a preset button of the first preset interface is touched is received; or determining whether a start recording instruction generated due to that a keyboard shortcut key of the first preset interface is touched is received; or determining whether a voice command corresponding to a start recording instruction is received by using the first preset interface.

The processor 201 may further be configured to perform the following step: after the determining whether a start recording instruction used for instructing to start recording the target video is received by using the first preset interface, if it is determined that the start recording instruction is received by using the first preset interface, displaying a recording sign indicating recording of the target video, the recording sign including a recording sign displayed in a form of animation and/or a recording sign displayed in a form of time.

The processor 201 may further be configured to perform the following steps: after the coding the media data to obtain a recorded video file of the target video, displaying a second preset interface; determining whether an end recording instruction is received by using the second preset interface, the end recording instruction being used for instructing to end recording the target video; and if it is determined that the end recording instruction is received by using the second preset interface, ending recording the target video in response to the end recording instruction.

The processor 201 may further be configured to perform the following steps: determining whether an end recording instruction generated due to that a preset button of the second preset interface is touched is received; or determining whether an end recording instruction generated due to that a keyboard shortcut key of the second preset interface is touched is received; or determining whether a voice command corresponding to an end recording instruction is received by using the second preset interface.

The processor 201 may further be configured to perform the following steps: after the coding the media data to obtain a recorded video file of the target video, displaying a third preset interface; determining whether a save instruction is received by using the third preset interface, the save instruction being used for instructing to save the recorded video file; and if it is determined that the save instruction is received by using the third preset interface, saving the recorded video file in response to the save instruction.

The processor 201 may further be configured to perform the following steps: determining whether a save instruction generated due to that a preset button of the third preset interface is touched is received; or determining whether a save instruction generated due to that a keyboard shortcut key of the third preset interface is touched is received; or determining whether a voice command corresponding to a save instruction is received by using the third preset interface.

The processor 201 may further be configured to perform the following steps: after the coding the media data to obtain a recorded video file of the target video, saving the recorded video file in the SDK of the first VR device; or saving the recorded video file in an SDK of a game client; or saving the recorded video file in an SDK of a game engine.

This embodiment of this application provides the solution of the video file processing method. A type of a first VR device is detected, the first VR device being used for displaying a to-be-recorded target video; an application on the first VR device is detected based on the type of the first VR device; media data of the target video is obtained from the application on the first VR device; and the media data is coded to obtain a recorded video file of the target video, video content of the recorded video file being the same as video content of the target video. In this way, the technical effect of recording a video displayed in a VR device is achieved, and the technology problem that a video displayed in a VR device cannot be recorded by using the related technology is resolved.

In a possible implementation of this embodiment of this application, for an example of this embodiment, refer to the examples described in the foregoing embodiments. Details are not described in this embodiment.

A person of ordinary skill in the art may understand that the structure shown in FIG. 19 is only an example. The terminal may be a terminal device such as a smartphone (for example, an Android phone or an iOS phone), a tablet computer, a palmtop computer, a mobile Internet device (HMD), or a PAD. FIG. 19 does not limit the structure of the foregoing electronic apparatus. For example, the terminal may include more or fewer components (such as a network interface or a display apparatus) than those shown in FIG. 19, or may have a configuration different from that shown in FIG. 19.

A person of ordinary skill in the art may understand that all or some of the steps of the method in the embodiments may be implemented by a program instructing relevant hardware of the terminal device. The program may be stored in a computer-readable storage medium, and the storage medium may be a flash memory, a ROM, a RAM, a magnetic disk, an optical disk, or the like.

An embodiment of this application further provides a non-transitory computer readable storage medium. The non-transitory computer readable storage medium stores instructions which when executed by at least one processor cause the at least one processor to perform a video file processing method. In this embodiment, the storage medium may be located in at least one of a plurality of network devices on a network shown in the foregoing embodiments.

In this embodiment, the storage medium may be configured to store program code for performing the following steps:

detecting a type of a first VR device, the first VR device being used for displaying a to-be-recorded target video;

detecting an application on the first VR device based on the type of the first VR device;

obtaining media data of the target video from the application on the first VR device; and coding the media data to obtain a recorded video file of the target video, video content of the recorded video file being the same as video content of the target video.

In a possible implementation of this embodiment of this application, the storage medium may further be configured to store program code for performing the following steps:

In a possible implementation of this embodiment of this application, the storage medium is further configured to store program code for performing the following steps: capturing a video image of the target video; obtaining image data of the target video based on the video image; obtaining audio data of the target video; and respectively coding the image data and the audio data to obtain the recorded video file.

In a possible implementation of this embodiment of this application, the storage medium may further be configured to store program code for performing the following steps: capturing a left-eye video image of the target video and a right-eye video image of the target video, obtaining left-eye image data of the target video based on the left-eye video image, obtaining right-eye image data of the target video based on the right-eye video image; stitching the left-eye image data and the right-eye image data to obtain the image data of the target video; and coding the image data to obtain the recorded video file.

In a possible implementation of this embodiment of this application, the storage medium may further be configured to store program code for performing the following steps: after the coding the image data to obtain the recorded video file, receiving a first playback instruction instructing to play the left-eye video image, and playing the left-eye video image based on the first playback instruction; and/or receiving a second playback instruction instructing to play the right-eye video image, and playing the right-eye video image based on the second playback instruction.

In a possible implementation of this embodiment of this application, the storage medium may further be configured to store program code for performing the following step: after the coding the media data to obtain a recorded video file of the target video, determining a video playback terminal matching the first VR device based on the type of the first VR device, the video playback terminal being used for connecting to the first VR device to obtain and play the recorded video file.

In a possible implementation of this embodiment of this application, the storage medium may further be configured to store program code for performing the following step: determining a planar video playback terminal matching the first VR device based on the type of the first VR device, the planar video playback terminal being used for playing the recorded video file in a 2D form, and the video playback terminal including the planar video playback terminal.

In a possible implementation of this embodiment of this application, the storage medium may further be configured to store program code for performing the following step: determining a second VR device matching the first VR device based on the type of the first VR device, the second VR device being used for playing the recorded video file in a 3D form, and the video playback terminal including the second VR device.

In a possible implementation of this embodiment of this application, the storage medium may further be configured to store program code for performing the following step: when the recorded video file is saved in the terminal, determining a fixed VR device matching the first VR device based on the type of the first VR device, the second VR device including the fixed VR device.

In a possible implementation of this embodiment of this application, the storage medium may further be configured to store program code for performing the following steps: after the coding the media data to obtain a recorded video file of the target video, processing the recorded video file to obtain processed data; and sending the processed data to a preset website; determining a mobile VR device matching the first VR device based on the type of the first VR device, the mobile VR device being used for playing the recorded video file based on the processed data by using the preset website, and the second VR device including the mobile VR device.

In a possible implementation of this embodiment of this application, the storage medium may further be configured to store program code for performing the following steps: when the type of the first VR device is a first type, starting a preset process to detect a process of the application and window information of the application on the first VR device; or when the type of the first VR device is a second type, invoking an SDK of the first VR device to obtain a process ID, and obtaining the process of the application and the window information of the application on the first VR device based on the process ID; and saving the process of the application and the window information of the application, and loading the application based on the process and the window information of the application.

In a possible implementation of this embodiment of this application, the storage medium may further be configured to store program code for performing the following steps: displaying a first preset interface; determining whether a start recording instruction is received by using the first preset interface, the start recording instruction being used for instructing to start recording the target video; and if it is determined that the start recording instruction is received by using the first preset interface, detecting the type of the first VR device in response to the start recording instruction.

In a possible implementation of this embodiment of this application, the storage medium may further be configured to store program code for performing the following steps: determining whether a start recording instruction generated due to that a preset button of the first preset interface is touched is received; or determining whether a start recording instruction generated due to that a keyboard shortcut key of the first preset interface is touched is received; or determining whether a voice command corresponding to a start recording instruction is received by using the first preset interface.

In a possible implementation of this embodiment of this application, the storage medium may further be configured to store program code for performing the following step: after the determining whether a start recording instruction used for instructing to start recording the target video is received by using the first preset interface, if it is determined that the start recording instruction is received by using the first preset interface, displaying a recording sign indicating recording of the target video, the recording sign including a recording sign displayed in a form of animation and/or a recording sign displayed in a form of time.

In a possible implementation of this embodiment of this application, the storage medium may further be configured to store program code for performing the following steps: after the coding the media data to obtain a recorded video file of the target video, displaying a second preset interface; determining whether an end recording instruction is received by using the second preset interface, the end recording instruction being used for instructing to end recording the target video; and if it is determined that the end recording instruction is received by using the second preset interface, ending recording the target video in response to the end recording instruction.

In a possible implementation of this embodiment of this application, the storage medium may further be configured to store program code for performing the following steps: determining whether an end recording instruction generated due to that a preset button of the second preset interface is touched is received; or determining whether an end recording instruction generated due to that a keyboard shortcut key of the second preset interface is touched is received; or determining whether a voice command corresponding to an end recording instruction is received by using the second preset interface.

In a possible implementation of this embodiment of this application, the storage medium may further be configured to store program code for performing the following steps: after the coding the media data to obtain a recorded video file of the target video, displaying a third preset interface; determining whether a save instruction is received by using the third preset interface, the save instruction being used for instructing to save the recorded video file; and if it is determined that the save instruction is received by using the third preset interface, saving the recorded video file in response to the save instruction.

In a possible implementation of this embodiment of this application, the storage medium may further be configured to store program code for performing the following steps: determining whether a save instruction generated due to that a preset button of the third preset interface is touched is received; or determining whether a save instruction generated due to that a keyboard shortcut key of the third preset interface is touched is received; or determining whether a voice command corresponding to a save instruction is received by using the third preset interface.

In a possible implementation of this embodiment of this application, the storage medium may further be configured to store program code for performing the following steps: after the coding the media data to obtain a recorded video file of the target video, saving the recorded video file in the SDK of the first VR device; or saving the recorded video file in an SDK of a game client; or saving the recorded video file in an SDK of a game engine.

For an example in this embodiment, refer to the examples described in the foregoing embodiments. Details are not described in this embodiment.

In this embodiment, the storage medium may include but is not limited to any medium that may store program code, such as a USB flash drive, a ROM, a RAM, a removable hard disk, a magnetic disk, an optical disk, or the like.

In addition, an embodiment of this application further provides a computer program product including instructions. The instructions, when run on a terminal, cause the terminal to perform the video file processing method provided in the foregoing embodiments.

The sequence numbers of the foregoing embodiments of this application are merely for description and do not indicate the preference of the embodiments.

When being implemented in a form of a software functional unit and sold or used as an independent product, the integrated unit in the foregoing embodiments may be stored in the foregoing computer-readable storage medium. Based on such an understanding, the technical solutions of this application essentially, or the part contributing to the existing technology, or all or some of the technical solutions may be implemented in a form of a software product. The computer software product is stored in a storage medium and includes several instructions for instructing one or more computer devices (which may be a PC, a server, a network device, or the like) to perform all or some of the steps of the methods in the embodiments of this application.

In the foregoing embodiments of this application, the description of each embodiment has respective focuses, and for the part that is not detailed in an embodiment, refer to the relevant description of other embodiments.

In the several embodiments provided in this application, it should be understood that the disclosed client may be implemented in other manners. The described apparatus embodiment is merely exemplary. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely exemplary implementations of the embodiments of this application. It should be noted that a person of ordinary skill in the art may make improvements and polishing without departing from the principle of the embodiments of this application, and these all fall within the protection scope of the embodiments of this application.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. A method for video file processing, comprising:
   detecting, by processing circuitry of an apparatus, a device type of a first virtual reality (VR) display device, the first VR display device being configured to display a target video to be recorded;
   detecting, by the processing circuitry, an application configured to display the target video on the first VR display device based on the device type of the first VR display device;
   obtaining, by the processing circuitry, left-eye and right-eye video images of the target video from the detected application on the first VR display device;
   generating, by the processing circuitry, a recorded video file of the target video based on the left-eye and right-eye video images obtained from the detected application;

identifying, by the processing circuitry, a video playback terminal device compatible with the first VR display device; and playing the recorded video file of the target video through the video playback terminal device.

2. The method according to claim 1, further comprising:
obtaining, by the processing circuitry, audio data of the target video; and
generating, by the processing circuitry, the recorded video file of the target video based on the left-eye and right-eye video images and the audio data.

3. The method according to claim 1, further comprising:
stitching, by the processing circuitry, the left-eye and right-eye video images; and
generating the recorded video file based on the stitched left-eye and right-eye video images.

4. The method according to claim 1, wherein the playing comprises:
playing the recorded video file in a two-dimensional (2D) form when the identified video playback terminal device is a 2D video playback terminal device that is compatible with the first VR display device based on the device type of the first VR display device,
playing the recorded video file in a three-dimensional (3D) form when the identified video playback terminal device is a fixed VR display device that is compatible with the first VR display device based on the device type of the first VR display device; and
playing processed data of the recorded video file that is provided to a preset website in a 3D form when the identified video playback terminal device is a mobile VR display device that is compatible with the first YR. display device based on the device type of the first YR display device.

5. The method according to claim 4, wherein the fixed VR display device includes a head mounted display (HMD), the HMD being used for playing the recorded video file in the 3D form by using a plugin.

6. The method according to claim 1, wherein the detecting the application comprises:
starting a preset process to detect a process of the application and window information of the application on the first YR display device when the device type of the first YR display device is a first device type;
invoking a software development kit (SDK) of the first VR display device to obtain a process identity (ID), and obtaining the process of the application and the window information of the application on the first YR display device based on the process ID when the device type of the first YR display device is a second device type; and
saving the process of the application and the window information of the application.

7. The method according to claim 1, wherein the detecting the device type of the first VR display device comprises:
displaying a first graphical user interface;
determining whether a start instruction is received via the first graphical user interface, the start instruction instructing the apparatus to start recording the target video; and
detecting the device type of the first VR display, device in response to the start instruction when the start instruction is determined to be received via the first graphical user interface, the start instruction being generated via at least one of a preset button of the first graphical user interface, a keyboard shortcut key of the first graphical user interface, or a voice command associated with the start instruction.

8. The method according to claim 1, further comprising:
displaying a second graphical user interface;
determining whether an end instruction is received via the second graphical user interface, the end instruction instructing the apparatus to stop recording the target video; and
stopping recording the target video in response to the end instruction when the end instruction is determined to be received via the second graphical user interface, the end instruction being generated via at least one of a preset button of the second graphical user interface, a keyboard shortcut of the second graphical user interface, or a voice command associated with the end instruction.

9. The method according to claim 1, further comprising:
displaying a third graphical user interface:
determining whether a save instruction is received via the third graphical user interface, the save instruction instructing the apparatus to save the recorded video file; and
saving the recorded video file in response to the save instruction based on the determination that the save instruction is received via the third graphical user interface, the save instruction is generated via at least one of a preset button of the third graphical user interface, a keyboard shortcut key of the third graphical user interface, or a voice command corresponding to the save instruction.

10. The method according to claim I, further comprising at least one of:
saving the recorded video file in a software development kit (SDK) of the first VR display device:
saving the recorded video file in an SDK of a game client; or
saving the recorded video file in an SDK of a game engine.

11. A video file processing apparatus, comprising:
processing circuitry configured to:
detect a device type of a first virtual reality (VR) display device, the first VR display device being configured to display a target video to be recorded;
detect an application configured to display the target video on the first VR display device based on the device type of the first VR display device;
obtain left-eye and right-eye video images of the target video from the detected application on the first VR display device; generating a recorded video file of the target video based on the left-eve and right-eye video images obtained from the detected application;
identify a video playback terminal device compatible with the first YR display device, and play the recorded video file of the target video through the video playback terminal device.

12. The video file processing apparatus according to claim 11, wherein the processing circuitry is configured to
obtain audio data of the target video; and
generate the recorded video file based on the left-eye and right-eve video images and the audio data.

13. The video tile processing apparatus according to claim 11, wherein the processing circuitry is configured to
stitch the left-eye and right-eye video images; and
generate the recorded video file based on the stitched left- and right-eye video images.

14. The video file processing apparatus according to claim 11, wherein the processing circuitry is configured to play the recorded video file in a two-dimensional (2D) form when the identified video playback terminal device is a two dimensional (2D) 2D video playback terminal device that is compatible with the first YR display device based on the device type of the first VR display device;
    play the recorded video file in a three-dimensional (3D) form when the identified video playback terminal device is a fixed VR display device that is compatible with the first VR display device based on the device type of the first YR display device; and
    play processed data of the recorded video file that is provided to a preset website in a 3D form when the identified video playback terminal device is a mobile VR display device that is compatible with the first VR display device based on the device type of the first VR display device.

15. The video file processing apparatus according to claim 14, wherein the fixed YR display device includes a head mounted display (HMD), the HMD being used for playing the recorded video file in the 3D form by using a plugin.

16. The video file processing apparatus according to claim 11, wherein the processing circuitry is configured to
    start a preset process to detect a process of the application and window information of the application on the first YR display device when the device type of the first YR display device is a first device type;
    invoke a software development kit (SDK) of the first YR display device to obtain a process identity (ID). and obtain the process of the application and the window information of the application on the first YR display device based on the process ID when the device type of the first YR display device is a second device type; and
    save the process of the application and the window information of the application.

17. The video file processing apparatus according to claim 11, wherein the processing circuitry is configured to
    display a first graphical user interface;
    determine whether a start instruction is received via the first graphical user interface, the start instruction instructing the apparatus to start recording the target video; and
    detect the device type of the first VR display device in response to the start instruction when the start instruction is determined to be received via the first graphical user interface, the start instruction being generated via at least one of a preset button of the first graphical user interface, a keyboard shortcut key of the first graphical user interface, or a voice command associated with the start instruction.

18. The video file processing apparatus according to claim 11, wherein the processing circuitry is configured to
    display a second graphical user interface;
    determine whether an end instruction is received via the second graphical user interface, the end instruction instructing the apparatus to stop recording the target video; and
    stop recording the target video in response to the end instruction when the end instruction is determined to be received via the second graphical user interface, the end instruction being generated via at least one of a preset button of the second graphical user interface, a keyboard shortcut of the second graphical user interface, or a voice command associated with the end instruction.

19. The video file processing apparatus according to claim 11, wherein the processing circuitry is configured to
    display a third preset graphical user interface;
    determine whether a save instruction is received via the third graphical user interface, the save instruction instructing the apparatus to save the recorded video file; and
    save the recorded video file in response to the save instruction based on the determination that the save instruction is received via the third graphical user interface, the save instruction is generated via at least one of a preset button of the third graphical user interface, a keyboard shortcut key of the third graphical user interface, or a voice command corresponding to the save instruction.

20. A non-transitory computer readable storage medium storing instructions which when executed by at least one processor cause the at least one processor to perform:
    detecting a device type of a first virtual reality (VR) display device, the first YR display device being configured to display a target video to be recorded;
    detecting an application configured to display the target video on the first YR display device based on the device type of the first VR display device;
    obtaining left-eye and right-eye video images of the target video from the detected application on the first YR display device;
    generating a recorded video file of the target video based on the left-eye and right-eye video images obtained from the detected application;
    identifying a video playback terminal device compatible with the first VR display device and playing the recorded video file of the target video through the video playback terminal device.

\* \* \* \* \*